(12) United States Patent
Ureche et al.

(10) Patent No.: US 12,182,297 B2
(45) Date of Patent: Dec. 31, 2024

(54) DATA PROTECTION FOR COMPUTING DEVICE

(71) Applicant: Google LLC, Mountain View, CA (US)

(72) Inventors: Tony Ureche, Bellevue, WA (US); Sergey Poromov, Munich (DE); Alex Huie, Pleasanton, CA (US); Nikita Poduzov, Munich (DE); Aya Mahmoud Ebrahim Elsayed, Munich (DE)

(73) Assignee: Google LLC, Mountain View, CA (US)

( * ) Notice: Subject to any disclaimer, the term of this patent is extended or adjusted under 35 U.S.C. 154(b) by 163 days.

(21) Appl. No.: 17/448,776

(22) Filed: Sep. 24, 2021

(65) Prior Publication Data
US 2023/0095576 A1 Mar. 30, 2023

(51) Int. Cl.
| G06F 21/62 | (2013.01) |
| G06F 21/10 | (2013.01) |
| G06F 21/78 | (2013.01) |
| G06F 21/84 | (2013.01) |
| H04L 9/40 | (2022.01) |
| H04W 12/08 | (2021.01) |

(52) U.S. Cl.
CPC .......... *G06F 21/6236* (2013.01); *G06F 21/10* (2013.01); *G06F 21/6245* (2013.01); *G06F 21/78* (2013.01); *G06F 21/84* (2013.01); *H04L 63/10* (2013.01); *H04W 12/08* (2013.01)

(58) Field of Classification Search
CPC .. G06F 21/62; G06F 21/6236; G06F 21/6245; G06F 21/78; G06F 21/81; G06F 21/84; H04L 63/10; H04W 12/08
See application file for complete search history.

(56) References Cited

U.S. PATENT DOCUMENTS

| 8,429,745 B1 | 4/2013 | Casaburi et al. |
| 10,949,961 B1 | 3/2021 | Narayanaswamy et al. |
| 2014/0032758 A1* | 1/2014 | Barton .................... H04L 41/00 709/225 |
| 2014/0194094 A1* | 7/2014 | Ahuja ................... H04W 4/029 455/410 |

(Continued)

OTHER PUBLICATIONS

International Search Report and Written Opinion for PCT Application No. PCT/US2022/076424, mailed on Dec. 21, 2022, 11 pages.

*Primary Examiner* — D'Arcy Winston Straub
(74) *Attorney, Agent, or Firm* — Brake Hughes Bellermann LLP

(57) ABSTRACT

According to an aspect, a method includes receiving data loss prevention (DLP) restriction data, where the DLP restriction data defines a first DLP control. The first DLP control identifies at least one content attribute of restricted content. The first DLP control identifies a restriction to a computer function when the restricted content is rendered on a display of a computing device. The method includes storing the DLP restriction data in a memory device associated with an operating system of the computing device, detecting, by the operating system, that content rendered on the display of the computing device includes at least a portion of the restricted content as identified by the at least one content attribute, and restricting the computer function during a period of time in which the portion of the restricted content is rendered on the display.

17 Claims, 10 Drawing Sheets

(56) References Cited

U.S. PATENT DOCUMENTS

| | | | |
|---|---|---|---|
| 2014/0298403 A1* | 10/2014 | Qureshi | H04L 63/20 |
| | | | 726/1 |
| 2015/0116212 A1* | 4/2015 | Freed | G06F 21/6245 |
| | | | 345/156 |
| 2017/0091482 A1* | 3/2017 | Sarin | H04L 63/1408 |
| 2018/0278505 A1* | 9/2018 | Sarin | G06F 21/604 |
| 2019/0340341 A1 | 11/2019 | Fleck et al. | |
| 2022/0100874 A1* | 3/2022 | Singh | G06F 21/6218 |
| 2022/0188413 A1* | 6/2022 | Singh | G06F 21/629 |

* cited by examiner

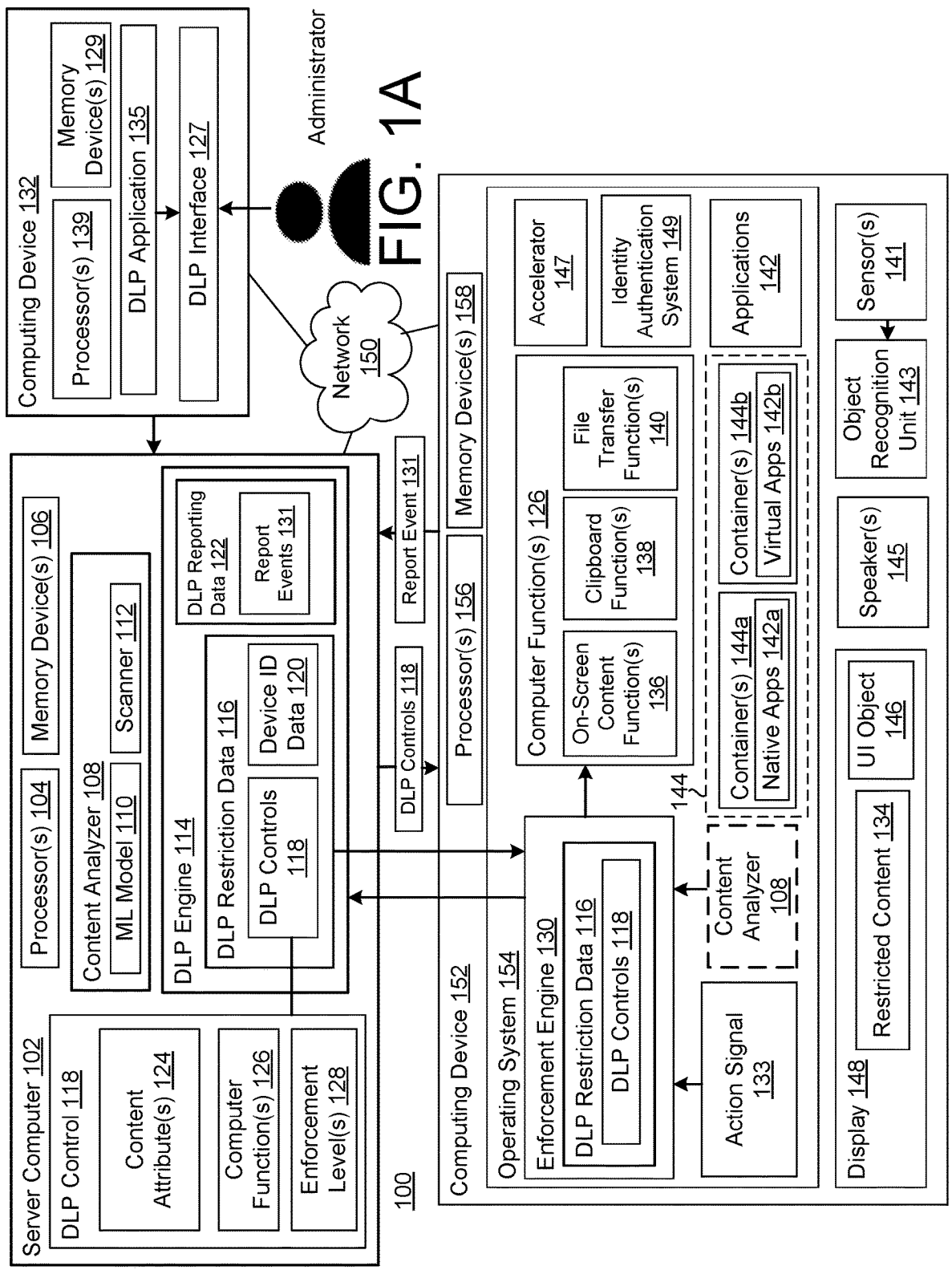

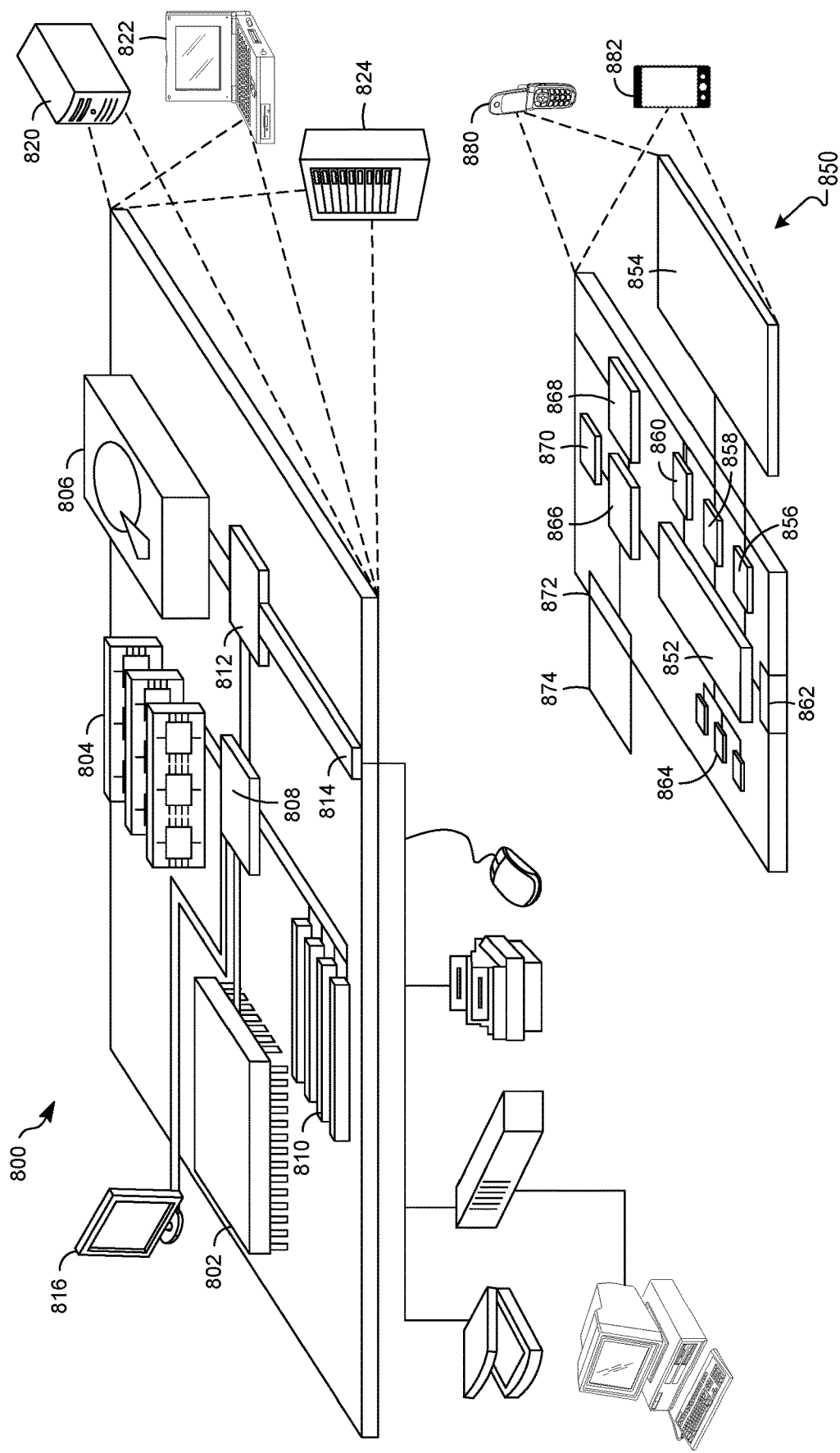

DATA PROTECTION FOR COMPUTING DEVICE

BACKGROUND

Data loss prevention (DLP) software may be executed by a particular application, website, and/or third party system to minimize data leakage incidents. For example, a video conference application that has DLP functionality may detect sensitive material and prevent an action taken with respect to the sensitive material, e.g., blocking a person from sharing that sensitive material in a chat section or a channel with external users. However, once sensitive content is transferred to (e.g., downloaded on) the user's device, an application provider may not maintain control over the sensitive data, which may lead to data loss.

SUMMARY

This disclosure relates to a data loss prevention (DLP) system, executable by an operating system of a computing device, configured to implement, locally and offline, data loss prevention (DLP) controls at an operating system level and across different applications. The DLP system provides a technical solution of integrating DLP controls with a user device's operating system, which provides a technical benefit of increasing the security of data on computing devices. For example, even if the user downloads restricted data (e.g., sensitive data) locally, because the DLP controls are implemented by the device's operating system, certain computer functionalities can still be restricted to minimize data leakage incidents. In some examples, instead of individually configuring multiple applications (or multiple types of applications) to implement DLP controls, the DLP controls are centrally managed and can be applied across a number of different applications executable by the user's device. For example, the computing device may execute native applications and virtual applications, which, in some examples, may require different DLP implementations, which can increase the complexity of a DLP solution. However, the DLP system discussed herein may configure a computing device to apply computer functionality restrictions for restricted (e.g., sensitive) content rendered by (and/or transferred to, from, and/or between) a virtual application and a native application that can reduce the amount of computing resources (e.g., memory, central processing unit (CPU) power).

At the same time, the DLP system may securely allow data to be shared between applications and other destinations while preventing accidental as well as malicious data leaks. The DLP system may selectively apply content restrictions (e.g., when sensitive data is at risk) instead of blocking actions altogether (some or most of the time) in a manner that does not overly restrict a user from using their computing device. Furthermore, the DLP system may enable an administrator to efficiently configure and manage a number of computing devices associated with the administrator's organization so that the computing devices can restrict one or more computer functions, such as printing, screencast, screenshot, viewing angle of displayed content (e.g., the enabling of an electronic privacy screen), file transfer, clipboard action(s) (e.g., copy/cut/paste), etc., to protect restricted data without expensive and/or resource-intensive computing resources (e.g., memory, CPU power).

The administrator may define a set of DLP controls that may cause a computing device to report, restrict, and/or block certain computer functions to be taken with respect to restricted content displayed on the screen and/or subject to a file transfer request. After the DLP controls are defined, the DLP controls may be uploaded to a server computer and transmitted to one or more computing devices that are associated with the organization so that they can be implemented locally and offline at each computing device. In addition, one or more of the DLP controls can be updated and these updates can be propagated to the individual computing devices in a relatively fast manner, so that changes to the DLP controls are quickly implemented at a local level, which can increase the security of the computing devices.

The DLP controls may indicate to restrict (e.g., limit, block) content having one or more content attributes (e.g., sources, destinations, keywords, etc.), such as webpages, local storage locations, or applications, restrict file transfers, and/or activate on-screen content restrictions for restricted content in the DLP controls. In some examples, the operating system may implement on-screen content restrictions such as restricting a screenshot function, restricting a screencast function, restricting a printing function, and/or enabling an electronic privacy screen (e.g., changing the display features of a display screen to restrict the viewing angle of restricted on-screen content). In some examples, the operating system may restrict one or more clipboard functions (e.g., disabling the pasting of data copied from a restricted source to a blocked destination). In some examples, the operating system may restrict a computer file from being transferred (e.g., uploaded, downloaded, transferred between applications, etc.).

The computing device includes an enforcement engine, executable by the operating system of the computing device, which can receive the DLP controls from the server computer and store the DLP controls in a memory device associated with the operating system. In some examples, the enforcement engine receives an action signal, which indicates that a certain action is taken with respect to content. The enforcement engine may determine that the content subject to the action signal is restricted content as defined by a DLP control. In some examples, a DLP control may identify attributes of content considered restricted (e.g., content attributes). For example, a DLP control may identify a source (and/or destination) of the content, where content rendered from the source is identified as restricted content. In some examples, the source is a web location (e.g., a universal resource locator (URL)). In some examples, the source is an application (e.g., a web application, native application, mobile application, etc.). In some examples, the source is storage (e.g., a file system, an external storage, etc.). In some examples, the action signal identifies the source, and the enforcement engine may determine whether the source identified in the action signal matches a content attribute in one of the DLP controls.

In some examples, a DLP control may identify one or more keywords (another restricted content attribute), where a content analyzer (executable by the computing device or the server computer) determines whether the content includes or is associated with the keywords. In some examples, the content analyzer is a text scanner configured to identify the terms of the content. In some examples, the content identifier is a machine-learning model configured to receive the content and determine whether the content is restricted. For example, the content analyzer may analyze the content to determine whether the content includes restricted information such as social security numbers, credit card information, trade secrets, confidential technical data, financial data, and/or personally identifiable information In some examples, the content analyzer is executable by the user's computing device. In some examples, the content analyzer is executable by a server computer.

In some examples, if the content subject to the action is determined to include restricted content, the enforcement engine may restrict one or more computer functions (or actions) that can be taken with respect to the restricted content such as an on-screen content restriction, a clipboard restriction, or a file transfer restriction. In some examples, content may be rendered on a display screen of the computing device. For example, a user may launch a first application (e.g., a web browser application or a non-browsing application) and interact with the first application to render content on the display screen of the computing device. The enforcement engine may detect that the content rendered on the display screen (e.g., on-screen content) includes the restricted content as identified by the DLP control, and, if so, the enforcement engine may restrict one or more computer functions (whichever is identified by the DLP control) such as disabling a screenshot function, disabling a screencast function, disabling a printing function, and/or enabling an electronic privacy screen in which a viewing angle is reduced. The same restricted content may be displayed by a second application, and the enforcement engine may detect that the on-screen content is restricted content and restrict one or more computer functions in the same manner as described above. As such, regardless which application is displaying the restricted content, the enforcement engine can implement DLP controls since detection and enforcement of the DLP controls are implemented at the operating system level.

The details of one or more implementations are set forth in the accompanying drawings and the description below. Other features will be apparent from the description and drawings, and from the claims.

According to an aspect, the method includes receiving data loss prevention (DLP) restriction data from a server computer, where the DLP restriction data defines a first DLP control. The first DLP control identifies at least one content attribute of restricted content. The first DLP control identifies a restriction to a computer function when the restricted content is rendered on a display of a computing device. The method includes storing the DLP restriction data in a memory device associated with an operating system of the computing device, detecting, by the operating system, that content rendered on the display of the computing device includes at least a portion of the restricted content as identified by the at least one content attribute, and restricting the computer function during a period of time in which the portion of the restricted content is rendered on the display.

According to some aspects, the method may include one or more of the following features (or any combination thereof). The method may include disabling the restriction to the computer function in response to the restricted content not being detected as rendered on the display. The computer function may include at least one of a screenshot function, a screencast function, or a printing function. The computer function may include a display screen function in which the restriction to the display screen function reduces a viewing angle of the content rendered on the display. The detecting step may include detecting, by a window manager of the operating system, a display event in response to a change of content on the display, extracting, by the window manager, content metadata from the display event, the content metadata identifying a content attribute of the content to be rendered on the display, and detecting, by the window manager, that the content attribute from the content metadata corresponds to the at least one content attribute of the first DLP control. The at least one content attribute may include a web location of a computer resource. The DLP restriction data may define a second DLP control, where the second DLP control identifies a restriction to a file transfer function to transfer a computer file. The method may include intercepting a file system event, extracting content metadata from the file system event, the content metadata identifying a content attribute of the computer file, detecting that the content attribute from the extracted content metadata corresponds to a content attribute identified in the second DLP control, and restricting transfer of the computer file. The DLP restriction data may define a second DLP control, where the second DLP control identifies a restriction to a clipboard function. The method may include detecting a clipboard request, extracting content metadata from the clipboard request, the content metadata identifying a content attribute of content subject to the clipboard function, detecting that the content attribute from the extracted content metadata corresponds to a content attribute identified in the second DLP control, and disabling the clipboard function.

According to an aspect, an apparatus comprises at least one processor and a non-transitory computer readable medium storing executable instructions that when executed by the at least one processor cause the at least one processor to store data loss prevention (DLP) restriction data in a memory device associated with an operating system of a computing device, the DLP restriction data defining a first DLP control, the first DLP control identifying at least one content attribute of restricted content, the first DLP control identifying a restriction to a computer function when at least a portion of the restricted content is rendered on a display of the computing device, detect a first display event in response to a change of content rendered on the display, extract content metadata from the first display event, the content metadata identifying a content attribute of the content rendered on the display, detect that the content attribute from the content metadata corresponds to the at least one content attribute in the first DLP control, and restrict the computer function during a period of time in which the portion of the restricted content is rendered on the display.

The apparatus may include one or more of the above/below features (or any combination thereof). The first display event is generated by a native application, wherein the executable instructions include instructions that, when executed by the at least one processor, cause the at least one processor to detect a second display event in response to a change of content rendered on the display, the second display event being generated by a virtual application, extract content metadata from the second display event, the content metadata of the second display event identifying a content attribute of the content rendered on the display, detect that the content attribute from the content metadata of the second display event corresponds to the at least one content attribute in the first DLP control, and restrict the computer function during a period of time in which the portion of the restricted content is rendered on the display. The executable instructions include instructions that, when executed by the at least one processor, cause the at least one processor to detect a second display event in response to a change of content rendered on the display, the second display event being detected after the first display event, extract content metadata from the second display event, the content metadata identifying a content attribute of the content rendered on the display, detect that the content attribute from the content metadata of the second display event does not correspond to the at least one content attribute in the first DLP control, and remove the restriction to the computer function. The restriction to the computer function may include enablement of an electronic privacy screen on the display. The DLP restriction data may define a second DLP control, where the second DLP control identifies a restriction to a file transfer function to transfer a computer file, wherein the executable instructions include instructions that when executed by the at least one processor cause the at least processor to intercept, by an application programming interface, a file system event, extract content metadata from the file system event, the content metadata identifying a content attribute of the computer file, detect that the content attribute from the extracted content metadata corresponds to a content attribute in the second DLP control, and restrict transfer of the computer file. The DLP restriction data defines a third DLP control, the third DLP control identifying a restriction to a clipboard function, wherein the executable instructions include instructions that, when executed by the at least one processor, cause the at least one processor to detect a clipboard request, extract content metadata from the clipboard request, the content metadata identifying at least one of a source or destination of content subject to the clipboard function, detect that at least one of the source or the destination from the extracted content metadata corresponds to at least one of a source or destination identified in the second DLP control, and disable the clipboard function.

According to an aspect, a non-transitory computer-readable medium storing executable instructions that, when executed by at least one processor, cause the least one processor to receive data loss prevention (DLP) restriction data from a server computer, the DLP restriction data defining at least one of a first DLP control or a second DLP control, the first DLP control identifying a restriction to a computer function when restricted content is rendered on a display of a computing device, the second DLP control identifying a restriction to a file transfer function when a computer file includes the restricted content, store the DLP restriction data in a memory device associated with an operating system of the computing device, detect, by the operating system, that the computer file or content rendered on the display of the computing device includes at least a portion of the restricted content, and restrict transfer of the computer file or restrict the computer function during a period of time in which the portion of the restricted content is rendered on the display.

The non-transitory computer-readable medium may include one or more of the above/below features (or any combination thereof). The executable instructions include instructions that, when executed by the at least one processor, cause the at least one processor to receive, by a content analyzer, contents of the computer file and detect, by the content analyzer, that the contents of the computer file includes at least a portion of the restricted content. The content analyzer includes a machine-learning model. The DLP restriction data defines the first DLP control, the second DLP control, and a third DLP control, the third DLP control identifying a restriction to a clipboard function, wherein the executable instructions include instructions that, when executed by the at least one processor, cause the at least one processor to apply the first DLP control, the second DLP control, and the third DLP control to content rendered from one or more native applications and one or more virtual applications.

BRIEF DESCRIPTION OF THE DRAWINGS

FIG. 1A is a block diagram of an example data loss prevention (DLP) system for increasing the security of a computing device according to an aspect.

FIG. 8 is a block diagram showing example or representative computing devices and associated elements that may be used to implement the systems and methods of FIGS. 1A-1D through 7 according to an aspect.

DETAILED DESCRIPTION

Figure 1B:
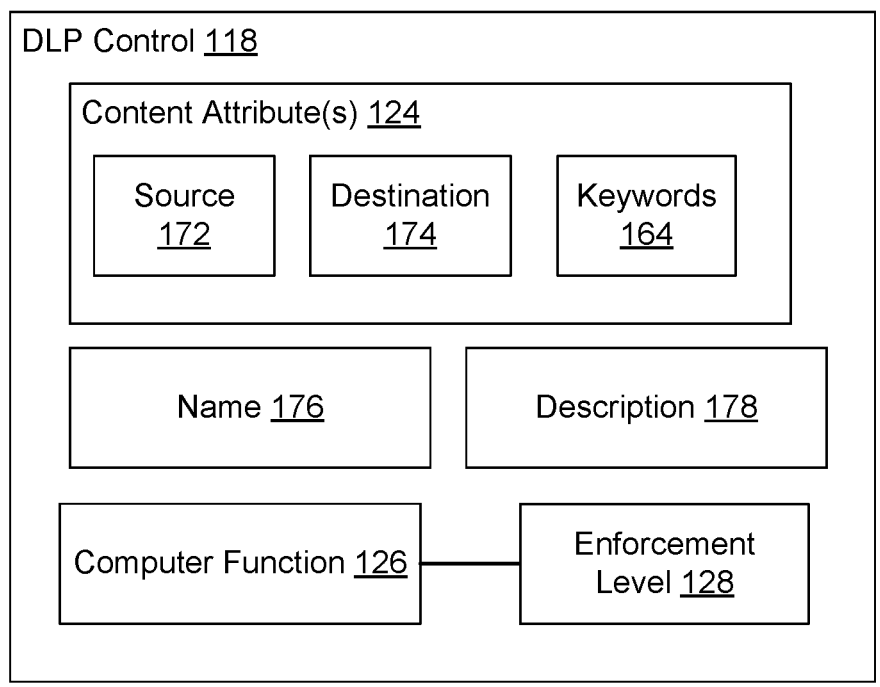
FIG. 1B illustrates an example of a DLP control implemented by a computing device according to an aspect.
Figure 1C:
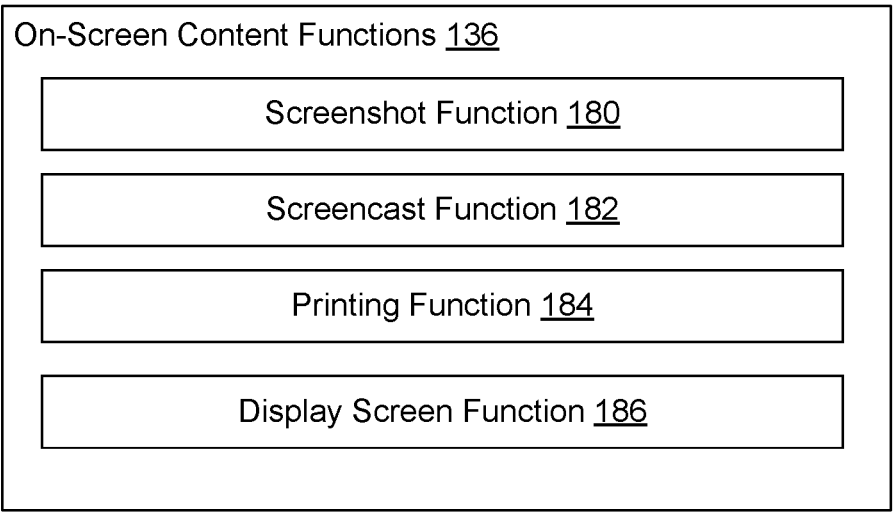
FIG. 1C illustrates examples of on-screen content functions that may be restricted by an operating system of the computing device according to an aspect.
Figure 1D:
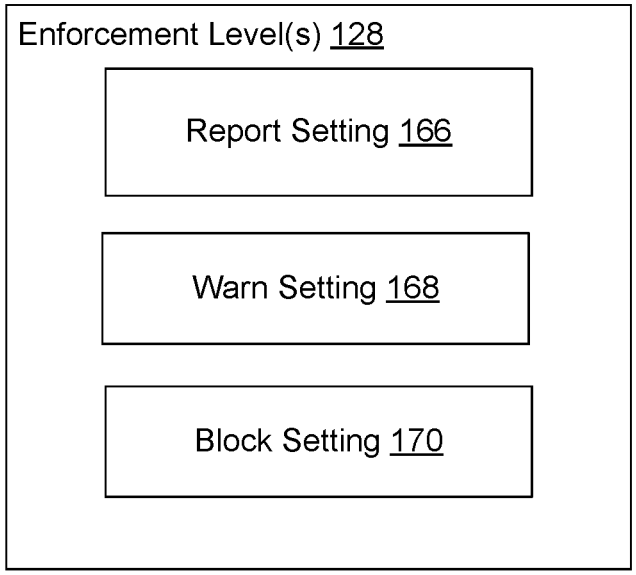
FIG. 1D illustrates examples of enforcement levels that can be applied to one or more computer functions involving restricted content according to an aspect.

FIGS. 1A through 1D illustrate an example data loss protection (DLP) system 100 according to an aspect. The DLP system 100 can configure a list of DLP controls 118 that are applied locally and offline by an operating system 154 of a computing device 152. In some examples, the computing device 152 is issued by an organization. The DLP system 100 may include a computing device 132 that allows an administrator to define DLP restriction data 116, which may include the DLP controls 118 and device identification data 120 that identifies which computing devices 152 are subject to the DLP controls 118. The DLP system 100 may also include a server computer 102. The server computer 102 includes a DLP engine 114 configured to communicate with the computing device 132 over a network 150 to receive the DLP restriction data 116. The DLP engine 114 stores the DLP restriction data 116 in a memory device 106 associated with the server computer 102. The DLP engine 114 may transmit, over the network 150, the DLP controls 118 to the computing devices 152 that are identified by the device identification data 120.

The computing device 152 may be any type of computing device that includes one or more processors 156, one or more memory devices 158, a display 148, and an operating system 154 configured to execute (or assist with executing) one or more applications 142. In some examples, the computing device 152 is a laptop or desktop computer. In some examples, the computing device 152 is a tablet computer. In some examples, the computing device 152 is a smartphone. In some examples, the computing device 152 is a wearable device. The display 148 is the display of the computing device 152. The display 148 may also include one or more external monitors that are connected to the computing device 152. The operating system 154 may include (or execute) an enforcement engine 130 configured to apply the DLP controls 118 (e.g., restrict one or more computer functions 126 for content that is identified as restricted content 134). In some examples, the restricted content 134 is sensitive data. In some examples, the restricted content 134 is confidential data. In some examples, the restricted content 134 is content that is controlled by an organization. In some examples, the enforcement engine 130 is executable by a sub-component of the operating system 154. In some examples, the enforcement engine 130 is executable by a plurality of sub-components of the operating system 154.

The operating system 154 may include (or execute) a content analyzer 108. The content analyzer 108 may receive and analyze content (e.g., on-screen content, content subject to a file transfer request, clipboard content, etc.) to determine whether the content includes the restricted content 134. In some examples, the content analyzer 108 is a module separate from the enforcement engine 130. In some examples, the content analyzer 108 is included as part of the enforcement engine 130. In some examples, the operating system 154 does not include the content analyzer 108. In some examples, the server computer 102 includes the content analyzer 108.

The operating system 154 is a system software that manages computer hardware, software resources, and provides common services for computing programs. In some examples, the operating system 154 is an operating system designed for a larger display 148 such as a laptop or desktop (e.g., sometimes referred to as a desktop operating system). In some examples, the operating system 154 is an operating system for a smaller display 148 such as a tablet or a smartphone (e.g., sometimes referred to as a mobile operating system).

The processor(s) 156 may be formed in a substrate configured to execute one or more machine executable instructions or pieces of software, firmware, or a combination thereof. The processor(s) 156 can be semiconductor-based—that is, the processors can include semiconductor material that can perform digital logic. The memory device (s) 158 may include a main memory that stores information in a format that can be read and/or executed by the processor (s) 156. The memory device(s) 158 may store applications (e.g., the operating system 154, applications 142, etc.) and modules (e.g., enforcement engine 130, content analyzer 108) that, when executed by the processors 156, perform certain operations.

The applications 142 may include any type of application that is configured to be executable (at least in part) by the computing device 152. The applications 142 may include one or more browser applications. A browser application is a web browser configured to access information on the Internet. The browser application may launch one or more browser tabs in the context of one or more browser windows on the display 148. The applications 142 include one or more web applications. A web application may be an application program that is stored on a remote server (e.g., a web server) and delivered over the network 150 through the browser application (e.g., a browser tab). In some examples, the web application is a progressive web application, which can be stored (at least in part) on the computing device 152 and used offline. The applications 142 may include one or more non-web applications (e.g., non-browser applications), which may be programs that are at least partially stored (e.g., stored locally) on the computing device 152 and/or executable by the operating system 154. In some examples, the non-web applications may be executable by (or running on top of) the operating system 154.

The applications 142 may include one or more native applications (e.g., native applications 142a). A native application is a software program that is developed for use on a particular platform or device, or for a particular operating system. In some examples, the native application is a software program that is developed for multiple platforms or devices. In some examples, the native application is a software program developed for use on a mobile platform and/or configured to execute on a desktop or laptop computer. In some examples, the applications 142 may include one or more mobile applications. A mobile application is a native application configured to execute on a mobile operating system of a mobile computing device such as a smartphone or a tablet. In some examples, the mobile applications can execute on a larger device such as a laptop or desktop computer. In some examples, the mobile applications may include an Android application, a mobile iOS application, and/or a mobile Windows application configured to execute on a mobile and/or desktop operating system. In some examples, the applications 142 may include one or more Linux applications (e.g., Linux applications in a virtualized environment).

The operating system 154 may include one or more software containers 144 that are configured to launch and execute one or more applications 142. In some examples, instead of (or additional to) using a software container 144, the operating system 154 defines a virtual machine that is configured to launch and execute one or more applications 142. The software containers 144 include one or more software containers 144a (or virtual machine(s)) configured to launch and execute native applications 142a and one or more software containers 144b (or virtual machine(s)) configured to launch and execute virtual applications 142b.

A software container 144 (or a virtual machine) may be an instance of an operating system 154 (e.g., software container 144a may be an instance of an operating system 154 and container 144b may be another instance of an operating system 154). In some examples, the software container 144a (or virtual machine) shares an operating system (OS) kernel with the software container 144b. In some examples, the software container 144a (or the virtual machine) does not share an OS kernel with the software container 144b (or the virtual machine). The OS kernel is the primary interface between the hardware and the processes of the computing device 152. The OS kernel is an initial program that is loaded into memory before the boot loader. The OS kernel may operate on device firmware, which operates on hardware firmware.

The software container 144a (or virtual machine) may be a runtime platform that includes software dependencies required by the native applications 142a, such as specific versions of programming language runtimes and other software libraries that assist with executing the native applications 142a. The software container 144b (or virtual machine) may be a runtime platform that includes software dependencies required by the virtual applications 142b, such as specific versions of programming language runtimes and other software libraries that assist with executing the virtual applications 142b.

As indicated above, a native application 142a is a software program that is developed for use on a particular platform or device, or for a particular operating system. A native application 142a is typically installed and executed on the computing device 152. For example, a native application 142a may be a web browser that is installed on the computing device 152 or other downloadable (or installable) applications that are executable by the software container(s) 144a (or virtual machine(s)). In some examples, a single software container 144a may launch and execute multiple native applications 142a. In some examples, different software containers 144a may launch and execute different types of native applications 142a. In some examples, the web browser may be launched and executed by a first software container 144a, and a mobile application may be launched and executed by a second software container 144a.

A virtual application 142b may be an application that is designed to execute in a virtual environment. In some examples, a virtual application 142b may refer to an application that executes on the computing device 152 without being installed on the computing device 152. Virtual applications 142b can be delivered to the computing device 152 via desktop (or application) virtualization and/or application packaging. When using desktop (or application) virtualization to deliver virtual applications 142b, the virtual application 142b itself is running on a computer in a data center that can reside in a company-owned data center or in a cloud provider. The user interface of the application 142b is sent via the network 150, to the computing device 152, where the user sees and can interact with the virtual application 142b as if it were running on the computing device 152. Virtual applications 142b delivered via application packaging (e.g., also referred to as application streaming) are configured to execute on the computing device 152 despite not actually being installed on the computing device 152. In some examples, a single software container 144b may launch and execute multiple virtual applications 142b. In some examples, different software containers 144b may launch and execute different types of virtual applications 142b. In some examples, a first virtual application 142b may be launched and executed by a first software container 144b, and a second virtual application 142b may be launched and executed by a second software container 144b.

The computing device 132 may be an example of the computing device 152 and may include any of the features discussed with reference to the computing device 152. For example, the computing device 132 may be a laptop or a desktop computer. In some examples, the computing device 132 may be a tablet or a smartphone. The computing device 132 may include one or more processors 139 and one or more memory devices 129. In some examples, the computing device 132 is associated with an administrator of an organization. For example, the administrator may be associated with an organization that owns or manages the computing device 152. For example, the computing device 152 (and the computing device 132) may be an enterprise-owned computing device such as a work computer owned or managed by the user's company or a school computer owned or managed by the user's school.

The computing device 132 is configured to execute (at least partially) a DLP application 135 that renders a DLP interface 127 to define the DLP controls 118 and/or the device identification data 120. In some examples, the DLP application 135 is a web application executable (at least in part) by a web browser to render the DLP interface 127. In some examples, the DLP application 135 is a native application installed and executed by an operating system of the computing device 132.

In one example, the administrator may use the DLP interface 127 to define a DLP control 118 to disable printing and screenshots for a computing device 152 (or a group of computing devices 152). For example, the administrator may use the DLP interface 127 to create a DLP control 118, where the DLP control 118 identifies a name 176 (e.g., "retail clerk"), identifies a description 178 (e.g., "corporate device for email and task in the breakroom"), identifies sources 172 (e.g., "*.company.com, gmail.com), and identifies restrictions (e.g., computer functions 126) (e.g., screenshots—blocked, screen capture—blocked, printing—blocked).

In another example, the administrator may use the DLP interface 127 to create another DLP control 118, where the DLP control 118 identifies a name 176 (e.g., retail clerk"), identifies a description 178 (e.g., "minimize risk of data loss from retail employees by restricting everything on the machine"), identifies the source 172 with a wildcard character (e.g., "*"—meaning all sources are identified as restricted), identifies the destination 174 with a wildcard character (e.g., "*"—meaning all destinations are blocked), and identifies a plurality of restrictions (e.g., computer functions 126) (e.g., screenshots—blocked, screen capture—blocked, clipboard—blocked, file upload—blocked, file transfer—blocked).

In another example, the administrator may use the DLP interface 127 to restrict users from doing anything outside a particular web application. For example, the DLP control 118 may identify a name 176 (e.g., "field worker"), identify a description 178 (e.g., "minimize risk of data loss from front line workers in the field by restricting everything they do on corporate sites"), identify restricted websites (e.g., "internal.company.com, outlook.com, zoom.com), identify blocked website destinations with a wildcard character (e.g., "*"—meaning all websites are blocked), identify other blocked destinations (e.g., external storage, drive, web applications and extensions, play applications and files, Linux applications), and identify a plurality of restrictions (e.g., computer functions 126) (e.g., screenshots—blocked, screen capture—blocked, clipboard—blocked, printing—blocked, file upload—blocked, file transfer—blocked, electronic privacy screen—enabled). In some examples, the DLP system 100 may provide an administrator to enable/disable the entire DLP layer (e.g., enable/disable the enforcement engine 130) and/or enable/disable individual DLP controls 118.

The computing device 152 (and the computing device 132) may communicate with the server computer 102 over the network 150. The server computer 102 may be computing devices that take the form of a number of different devices, for example a standard server, a group of such servers, or a rack server system. In some examples, the server computer 102 may be a single system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections.

The server computer 102 may include one or more processors 104 formed in a substrate, an operating system (not shown) and one or more memory devices 106. The memory devices 106 may represent any kind of (or multiple kinds of) memory (e.g., RAM, flash, cache, disk, tape, etc.). In some examples (not shown), the memory devices 106 may include external storage, e.g., memory physically remote from but accessible by the server computer 102. The server computer 102 may include one or more modules or engines representing specially programmed software. The server computer 102 includes a DLP engine 114 configured to communicate with the computing device 132 over the network 150 to receive the DLP restriction data 116. The DLP engine 114 stores the DLP restriction data 116 in a memory device 106 associated with the server computer 102. The DLP engine 114 may transmit, over the network 150, the DLP controls 118 to the computing devices 152 that are identified by the device identification data 120. In some examples, the server computer 102 may include the content analyzer 108.

The enforcement engine 130 on the computing device 152 is configured to receive, over the network 150, the DLP restriction data 116 from the DLP engine 114 on the server computer 102, where the DLP restriction data 116 includes the DLP control(s) 118. The enforcement engine 130 may store the DLP controls 118 on a memory device 158 associated with the operating system 154. The DLP engine 114 may receive and store the DLP control(s) 118 in response to the user and/or the administrator accepting, joining, or registering with the DLP system 100. In some examples, the user may be required to explicitly opt-in to the DLP system 100. In some examples, when the administrator identifies the computing device 152 within the DLP restriction data 116 and the DLP restriction data 116 is received and stored on the server computer 102, the DLP controls 118 are set to be delivered to the computing device 152. In some examples, the computing device 152 is pre-configured with the DLP control(s) 118. For example, a user may be assigned or issued the computing device 152 with the DLP control(s) 118 already stored in the memory device 158. In some examples, in response to the computing device 152 being activated (e.g., turned-on) and connected to the network 150, the enforcement engine 130 is configured to communicate with the DLP engine 114 to obtain the DLP controls 118 and/or obtain any updates to the DLP controls 118.

A DLP control 118 may define one or more content attributes 124 that are configured to identify which content is restricted content 134. A DLP control 118 may also define one or more computer functions 126 that are monitored and/or restricted with respect to the restricted content 134, and one or more enforcement levels 128, which specify the level of restriction (e.g., reported, warned, and/or blocked) for each identified computer function 126. The enforcement engine 130 may use the content attribute(s) 124 to determine whether content that is subject to a computer function 126 includes restricted content 134. If so, the enforcement engine 130 may determine which computer functions 126 are identified by the DLP control 118 and restrict the computer function(s) 126 according to its specified enforcement level 128.

Generally, a content attribute 124 may include information that identifies a computer resource having restricted content 134. The content attribute 124 may include a web location (e.g., a universal resource locator (URL)) of a web resource (e.g., a website, web app, browser extension, web storage, etc.). In some examples, the web location includes a resource pattern (e.g., a URL pattern). The content attribute 124 may identify an application 142 having restricted content 134. In some examples, the content attribute 124 may include an identifier (e.g., a name) of the application 142. In some examples, the content attribute 124 may include a location of the application 142. In some examples, any information that is rendered from the application 142 is considered restricted content 134. In some examples, the content attribute 124 may identify the application 142 and a portion of the application 142, where any information from the identified portion of the application 142 is considered restricted content 134. The content attribute 124 may identify storage. The storage may be a file-system (or a portion thereof) of the computing device 152. In some examples, the storage may be an external storage connected to the computing device 152. In some examples, any information that is included within the identified storage is considered restricted content 134.

The content attributes 124 may include one or more sources 172. A source 172 may be any type of computer resource, e.g., an application 142, a web resource identified by a web location, storage, an operating system (OS) user interface (or component). In some examples, a source 172 is a web-based source such as a web page, an OS user interface (or component), and/or a web application (including a web browser or browser extension). In some examples, the source 172 is identified by a resource pattern (e.g., a URL pattern). Any URLs that match a URL pattern listed under the content attributes 124 are identified as containing restricted content 134. In some examples, the source 172 may be defined to allow a wildcard character (e.g., *) to specify all possible URLs. For example, if the source 172 is identified as "*.company.com", then all content from the frame and subframes that end in ".company.com" will be identified as containing restricted content 134 (e.g., userA-.company.com, userb.company.com, etc.).

The content attributes 124 may include one or more destinations 174 (e.g., blocked destinations) for one or more given sources 172. A destination 174 may be any type of computer resource, e.g., an application 142, a web resource identified by a web location, storage, an operating system (OS) user interface (or component). In some examples, a destination 174 is a web-based source such as a web page, an OS user interface (or component), and/or a web application (including a web browser or browser extension). In some examples, the destination 174 is identified by a resource pattern (e.g., a universal resource location (URL) pattern). Any URLs that match a URL pattern listed under the content attributes 124 are identified as blocked destinations. In some examples, the destination 174 may be defined to allow a wildcard character (e.g., *) to specify all possible URLs that are blocked. For example, if the destination 174 is identified as "*.company.com", then all content from the frame and subframes that end in ".company.com" will be identified as blocked.

In some examples, a DLP control 118 may define a name 176. The name 176 may be used to show a notification (e.g., UI object 146) to the user. In some examples, DLP control 118 may define a description 178. The description 178 may be a short description that describes the computer function 126 that is being restricted. The description 178 may be used to show a notification (e.g., UI object 146) to the user.

In some examples, the content attributes 124 may include one or more keywords 164. The keyword(s) 164 may include one or more terms (e.g., words, phrases, numbers, etc.). If the content that is subject to the computer function 126 (e.g., a computer file) includes or is associated with the keyword(s) 164, the content (e.g., computer file) may be determined as restricted content 134. In some examples, the keyword(s) 164 are used in conjunction with the content analyzer 108, which is explained later in the disclosure.

A DLP control 118 may also identify one or more computer functions 126 that are restricted (and/or monitored) for restricted content 134 identified by the content attribute 124. A computer function 126 may be a computer action, initiated by the user, that can be taken with respect to the restricted content 134 in which the restricted content 134 can be disseminated to a different location digitally or physically (e.g., displayed, transferred, printed, etc.). The computer functions 126 may include several classes of computer functions such as on-screen content functions 136, clipboard functions 138, and/or file transfer functions 140. The on-screen content functions 136 may include a screenshot function 180, a screencast function 182, a printing function 184, and/or a display screen function 186.

In some examples, the computer functions 126 may relate to the transfer, playback, or streaming of audio data from a source (e.g., source 172) or to a destination (e.g., destination 174) (e.g., audio output and/or audio input), where a DLP control 118 may define a restriction to one or more computer functions 126 relating to the input and/or output of audio data if the audio data has one or more content attributes 124. The source (e.g., source 172) of the audio may be a file on the operating system 154 of the computing device 152 or an application 142 (e.g., either native application 142a or virtual application 142b) on the computing device 152. The source of the audio may be from an external device connected (e.g., wired, or wireless) to the computing device 152 or from an external server connected via the network 150 (e.g., websites, Internet storage, etc.). In some examples, audio input may refer to the input of audio data to the computing device 152 from an audio source. Audio output may refer to the output of audio data by the computing device 152 via one or more speakers 145 associated with the computing device 152 or to another device connected to the computing device 152. If audio to be inputted by the computing device 152 (or outputted by the computing device 152) has restricted content 134 identified by one or more content attributes 124, the audio data may be prevented from being transferred, played, and/or streamed. In some examples, if an audio file includes restricted content 134 and non-restricted content, only the portion of the audio data that includes the restricted content 134 is blocked. In some examples, the entire audio file is blocked.

In some examples, the computer functions 126 may relate the transfer, playback, or streaming of video data (e.g., video input and/or video output), where a DLP control 118 may define a restriction to one or more computing functions 126 that can restrict the transfer or display of video data from a source 172 (or to a destination 174) if the video data has one or more content attributes 124. For example, if video to be inputted by the computing device 152 (or outputted by the computing device 152) has restricted content 134 identified by one or more content attributes 124, the video data may be prevented from being transferred, played, and/or streamed. In some examples, if a video file includes restricted content 134 and non-restricted content, only the portion of the video data that includes the restricted content 134 is restricted. In some examples, the entire video file is restricted.

In some examples, the computer functions 126 may include wireless communication of data from one device to another device (e.g., directly from one device to one or more other devices), such as a Bluetooth transmission, near-field communication (NFC) transmission, infrared (IR) transmission, and/or other wireless transmissions of data (including Wi-Fi). Bluetooth is a type of wireless communication used to transmit audio and/or data at relatively high speeds using radio waves. NFC transmission may be a communication protocol for communication between two electronic devices over a threshold distance (e.g., less than five centimeters) that is used to exchange data. Infrared transmission may refer to the transmission of data and/or audio information over IR light between two or more electronic devices. In some examples, the wireless data transfer between two devices may use a communication protocol (e.g., Bluetooth) to establish a Wi-Fi connection between two devices, and the data is transferred over the Wi-Fi connection. In some examples, the wireless data transfer occurs over Bluetooth, NFC, infrared, or other wireless communication protocols.

In some examples, a user may use the computing device 152 to share links, files, messages, and/or other items (e.g., photos, documents, websites, videos, notes, map locations, applications from a digital media store, etc.) from the computing device 152 with another device (e.g., nearby devices) using a wireless communication link. For example, a user may select a share option to share a particular item (or multiple items) and then select a recipient device (which may be discoverable by the computing device 152 using Bluetooth or other short-range wireless protocols), where the item(s) are transmitted to the recipient device over the wireless communication link. In some examples, the recipient device may be required to accept the transfer of data before the transmission occurs. In some examples, the operating system 154 may use Bluetooth to establish a Wi-Fi connection (e.g., peer-to-peer connection or direct connection) between two devices.

If the item includes restricted content 134 identified by one or more content attributes 124, the restricted content 134 may be blocked to be transmitted via the wireless communication link. For example, if the link, file, message, or other item is from a source 172 (or to a destination 174) identified by the DLP control 118, that data may be blocked from being transmitted over the wireless communication link.

In some examples, in addition to (or alternatively from) identifying types of restricted content 134, the DLP control 118 may indicate to restrict users (or types of users) that can receive a wireless communication data transfer from the computing device 152. For example, the DLP control 118 may restrict wireless communication data transfers to other devices logged-in (and/or owned) by the user of the computing device 152 and/or to other devices associated with people in the organization that owns or manages the computing device 152. In some examples, the operating system 154 may be associated with an identity authentication system 149. The identity authentication system 149 can authenticate a user of the computing device 152 (e.g., using a password, biometric, digital certificate, etc.), such as when the user of the computing device 152 logs into the computing device 152. Also, the identity authentication system 149 can identify and authenticate users of other computing devices that are targets of wireless communication data transfers. In some examples, the identity authentication system 149 is included on the operating system 154 of the computing device 152. In some examples, the identity authentication system 149 (or a portion thereof) is not executable by the computing device 152, but the computing device 152 communicates with the identity authentication system 149 over the network 150.

In some examples, the DLP control 118 may indicate to restrict wireless data transfers to devices associated with people within the organization (or a group of people within the organization or having certain roles within the organization). In some examples, the identity authentication system 149 and/or the enforcement engine 130 can store authorized personal information that identifies people (by their user accounts, roles, etc.) within the organization (or a subset thereof) and/or identifies devices associated with the people within the organization (or a subset thereof) which data can be transferred. In some examples, the enforcement engine 130 intercepts a signal (e.g., action signal 133) relating to a wireless communication transfer to a recipient device and extracts information about the recipient device and/or the user of the recipient device. The identity authentication system 149 may authenticate the user of the recipient device using the extracted information. If the authenticated user is not identified within the authorized personal information, the enforcement engine 130 may block the wireless communication transfer. If the authenticated user is identified within the authorized personal information, the enforcement engine 130 may permit the wireless communication transfer.

The enforcement levels 128 may include a report setting 166, a warn setting 168, and/or a block setting 170. If the report setting 166 is specified for a particular computer function 126, the enforcement engine 130 may transmit, over the network 150, a report event 131 that includes information about the computer function 126 to the DLP engine 114, which is stored as DLP reporting data 122. In some examples, the enforcement levels 128 include an allow setting, which can override other enforcement levels 128 to explicitly allow sharing in specific situations (e.g., thereby making it easier in practice to carve out exceptions to broad based rules using a wildcard (*) to block everything). For example, an administrator may define a DLP control 118 that specifies a wildcard (*) to block on-screen content (or block file transfers or block clipboard functions) from all URLs. However, the allow setting may permit the administrator to specify one or more ULRs, which would override the blocked designation.

Also, it is noted that a user may be provided with controls allowing the user to make an election as to both if and when systems, programs or features described herein may enable collection of user information (e.g., DLP reporting data 122) (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, the DLP reporting data 122 may include information reported by the enforcement engine 130 but the user information associated with the DLP reporting data 122 may be removed or anonymized. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In some examples, if the report setting 166 is specified for a particular computer function 126, the enforcement engine 130 does not restrict the particular computer function 126 (e.g., the user is still allowed to print, screencast, screenshot, copy/paste, or file transfer, etc.).

If the warn setting 168 is specified for a particular computer function 126, the enforcement engine 130 may render a UI object 146 that warns the user that the content subject to the particular computer function 126 includes restricted content 134. In some examples, if the warn setting 168 is specified for a particular computer function 126, the enforcement engine 130 does not restrict the particular computer function 126. In some examples, if the warn setting 168 is specified for a particular computer function 126, the enforcement engine 130 is configured to require receipt of a user gesture taken with respect to the UI object 146 in order to permit execution of the particular computer function 126 (e.g., clicking "ok" to enable printing).

In some examples, if the block setting 170 is specified for a particular computer function 126, the enforcement engine 130 is configured to disable the particular computer function 126. In some examples, one enforcement level 128 is specified for a particular computer function 126. In some examples, multiple enforcement levels 128 can be specified for a particular computer function 126 (e.g., any combination of the report setting 166, the warn setting 168, and the block setting 170).

On-screen content functions 136 may refer to computer actions that can be taken with respect to content that is rendered on the display 148 (e.g., visible to the user). For example, the administrator may define one or more DLP controls 118 to automatically enable restrictions that will prevent leaks of restricted content 134 that is visible on the display 148 at the moment.

A restriction to the screenshot function 180 may disallow a user to take screenshots if the restricted content 134 (which is defined by the list of sources 172) is rendered on the display 148. A restriction to the screencast function 182 may disallow a user to share/cast their display 148 if the restricted content 134 (which is defined by the list of sources 172) is rendered on the display 148. A restriction to the printing function 184 may disallow a user to print restricted content 134 (which is defined by the list of sources 172). A restriction to a display screen function 186 may trigger the operating system 154 to enable an electronic privacy screen if restricted content 134 (which is defined by the list of sources 172) is rendered on the display 148.

The enforcement engine 130 may detect that content rendered on the display 148 includes restricted content 134 as identified by a DLP control 118, and, if so, may restrict one or more of the on-screen content functions 136 (e.g., disallowing screenshots, disallows screen-casting, enabling an electronic privacy screen, disallowing printing and "save as" option on the page, etc.). In some examples, the enforcement engine 130 may enable a restricted state for one or more on-screen content functions 136 when restricted content 134 is detected on the display 148. In some examples, when an on-screen content function 136 is in the restricted state, the on-screen content function 136 is deactivated or disabled. In some examples, the enforcement engine 130 may detect when the restricted content 134 is not rendered on the display 148 (e.g., when it's hidden (occluded) and/or closed), which then transitions the on-screen content functions 136 back to a normal state (e.g., activated state). For example, the enforcement engine 130 may enable a normal state for one or more on-screen content functions 136 when restricted content 134 is not detected on the display 148.

In response to the detection of restricted content 134 on the display 148, the enforcement engine 130 may report, warn, and/or block (e.g., disable) the screenshot function 180. A screenshot (also referred to as a screen capture or screen grab) is a digital image that shows the content (or a portion thereof) of a display 148. In some examples, the UI control (or the hot-key) that allows the user to obtain a screenshot of content rendered on the display 148 is disabled.

In response to the detection of restricted content 134 on the display 148, the enforcement engine 130 may report, warn, and/or block (e.g., disable) the screencast function 182. A restriction to the screencast function 182 may report, warn, and/or block an action of screen-casting at least a portion of restricted content 134 on the display 148 on another display. A screencast may include the sharing of at least a portion of the content of the display 148 with another display, which may include screen mirroring and/or screen sharing. In some examples, the UI control (and/or the hot-key) that allows the user to screencast their display 148 is disabled. In response to the detection of restricted content 134 on the display 148, the enforcement engine 130 may report, warn, and/or block (e.g., disable) the printing function 184. In some examples, the UI control (and/or the hot-key) that allows the user to print the restricted content 134 is disabled.

The enforcement engine 130 may alter the display screen function 186 so that the display 148 is configured as an electronic privacy screen (as further discussed below). The alteration of the display screen function 186 may change one or more display aspects of the display 148 so that the restricted content 134 is less visible to people or devices that are around the computing device 152. In some examples, the display screen function 186 reduces the display visibility angle (e.g., the viewing angle) so that information can be viewed on the display 148 from a narrower angle (thereby preventing people from peeking at the user's display 148 when viewing restricted content 134 (e.g., in public). In some examples, the alteration of the display screen function 186 includes the enabling of an electronic privacy screen. In other words, when the display screen function 186 is identified as restricted in the DLP control 118, a filter may be applied to the display 148 so that the display 148 is transformed into an electronic privacy screen, which reduces the viewing angle (and/or reduces the brightness of the display 148).

In some examples, the enforcement engine 130 may communicate with one or more sensors 141 and/or an object recognition unit 143 to determine whether a person (not the user of the computing device 152) is viewing content displayed on the display 148 and/or whether the content displayed on the display 148 is within a field of view of another camera device, and, if the displayed content includes the restricted content 134, the enforcement engine 130 may enable the electronic privacy screen so that the display angle is narrowed to be outside the person's gaze (or detected facial features) and/or outside the field of view of the camera device. In some examples, the enforcement engine 130 may enable the electronic privacy screen if more than one person is detected viewing the content. In some examples, instead of (or in addition to) enabling the electronic privacy screen, the enforcement engine 130 may remove the on-screen content having the restricted content 134 (or distort the restricted content 134 so the restricted content 134 is not readable) and/or generate a warning to the user (e.g., rendering a UI object 146 indicating that someone may be looking at the restricted content 134). In some examples, the UI object 146 may remain on the display 148 until the person (other than the user) is not detected or the camera device is not detected. In some examples, if the person is detected as looking away from the display 148 (or moves outside the view of the camera on the computing device 152), the enforcement engine 130 may re-render (or un-distort) the on-screen content having the restricted content 134 and/or remove the UI object 146 that provides the warning to the user.

The sensor(s) 141 may include one or more image sensors (e.g., cameras) that generate image data. In some examples, the image sensors may include a front-facing camera (e.g., that faces (e.g., within the field of view of) the user of the computing device 152). In some examples, the sensor(s) 141 may include an eye tracker, which may be a device for measuring the eye position and/or eye movement of a person. In some examples, the eye tracker can detect the presence, attention, and/or focus of a person. In some examples, the eye tracker can measure the point of gaze (e.g., where one is looking). In some examples, the sensor(s) 141 may include an inertial motion unit (IMU). The IMU may detect motion, movement, and/or acceleration of the computing device 152. The IMU may include various different types of sensors such as, for example, an accelerometer, a gyroscope, a magnetometer, and other such sensors. The sensor(s) 141 may include other types of sensors such as a light sensor, an audio sensor, a distance and/or proximity sensor, a contact sensor such as a capacitive sensor, a timer, and/or other sensors and/or different combination(s) of sensors.

The object recognition unit 143 may receive the image data from the sensor(s) 141 (e.g., the front-facing camera) and detect objects (e.g., types or classifications of objects) within the image data. In some examples, the object recognition unit 143 may detect that the image data includes a human person. In some examples, the object recognition unit 143 is a face detection unit configured to detect the presence of a face of a person using the image data. In some examples, the object recognition unit 143 includes a facial recognition unit configured to determine that the detected face is not the face of the user of the computing device 152. For example, the object recognition unit 143 may include or obtain image data (e.g., facial data) of the user of the computing device 152 and may use that image data to determine whether the detected facial features correspond to the user's stored image data. The user may be provided with controls that enable the user to opt-in (or opt-out of) collecting and image data of the user. In some examples, the object recognition unit 143 receives the image data and information from the eye tracker to determine whether a person detected within the image data has a gaze direction that intersects with the display 148. In some examples, the object recognition unit 143 may detect that the image data includes a camera sensor on another device. In some examples, the object recognition unit 143 may detect that the field of view of the camera sensor on the other device intersects with the display 148.

In some examples, if the object recognition unit 143 detects a person (or facial features of a person) from the image data, the enforcement engine 130 may receive a signal from the object recognition unit 143 to apply one or more DLP controls 118 to enable the electronic privacy screen and/or block (or distort) display of restricted content 134. In some examples, if the object recognition unit 143 detects that a person's gaze direction (other than the user) intersects with the display 148, the enforcement engine 130 may receive a signal from the object recognition unit 143 to apply one or more DLP controls 118 to enable the electronic privacy screen and/or block (or distort) display of restricted content 134. In some examples, if the object recognition unit 143 detects a camera device (or a field of view of a camera device within content displayed on the display 148), the enforcement engine 130 may receive a signal from the object recognition unit 143 to apply one or more DLP controls 118 to enable the electronic privacy screen and/or block (or distort) display of restricted content 134.

In response to the detection of restricted content 134 on the display 148, the enforcement engine 130 may report, warn, and/or block (e.g., disable) a clipboard function 138. A clipboard function 138 may refer to an action of a computer clipboard. A clipboard function 138 may enable the cutting, copying, and pasting of information from one place to another place. A computer clipboard is a temporary location (e.g., buffer) on the operating system 154 of the computing device 152 that temporarily stores cut or copied data. Once data is stored in the clipboard, the data can be pasted to a new location. The computer clipboard may provide an application programming interface by which programs can specify cut, copy, and paste operations. Using the computer clipboard, a user can transfer data within and/or between applications 142 and OS components.

In response to the detection of restricted content 134 on the display 148, the enforcement engine 130 may report, warn, and/or block (e.g., disable) a file transfer function 140. A file transfer function 140 may be the transfer of content from one computer location to another computer location, which may include the downloading and/or uploading of content from and/or to the computing device 152. For example, if the user moves content (e.g., a file) from a managed access point, the organization may lose control on how that content is accessed and shared. However, the DLP system 100 may allow administrators to manage how users handle restricted content 134 on the computing device 152 to manage access and use of sensitive data. In some examples, a restriction to the file transfer function 140 may disallow a user to transfer content (e.g., files) downloaded from (or stored on) sources 172 to destinations 174. Destinations 174 could be both web pages (e.g., file upload scenario) or guest operating systems (e.g., software containers 144b or external storages).

In response to the detection of restricted content 134 subject to device-to-device wireless transmission (e.g., Bluetooth, NFC, Infrared, Wi-Fi, etc.), the enforcement engine 130 may report, warn, and/or block the wireless transmission to the other device. For example, a user may use the computing device 152 to share links, files, messages, and/or other items with another device using a wireless communication link. If the item includes restricted content 134 identified by one or more content attributes 124, the enforcement engine 130 may report, warn, and/or block the restricted content 134 from being transmitted via the wireless communication link. In some examples, if the link, file, message, or other item is from a source 172 identified by the DLP control 118, that item may be blocked from being transmitted over the wireless communication link. In some examples, the DLP control 118 may restrict wireless communication data transfers to other devices logged-in (and/or owned) by the user of the computing device 152 and/or to other devices associated with people in the organization that owns or manages the computing device 152. For example, the enforcement engine 130 may communicate with the identity authentication system 149 to authenticate users of devices that are targets of device-to-device data transfers, and, if a user of a target device is not specified by the authorized user information, the enforcement engine 130 may block the device-to-device data transfer.

The enforcement engine 130 is configured to execute the DLP control(s) 118 while the user is using their computing device 152. The DLP controls 118 are applied at an operating system level (e.g., by the operating system 154 of the computing device 152) so that the DLP controls 118 can be applied across one or more applications 142 executable by the computing device 152. The enforcement engine 130 receives an action signal 133, which indicates that a certain action is taken with respect to content. The enforcement engine 130 may determine that the content subject to the action signal 133 is restricted content 134 as defined by a DLP control 118.

In some examples, with respect to on-screen content, the action signal 133 may include a signal that identifies content that is displayed on the display 148. In some examples, the action signal 133 identifies a web location (e.g., URL pattern), and if the web location is a content attribute 124 identified by the DLP control 118, the enforcement engine 130 determines that the on-screen content is restricted content 134. In some examples, the action signal 133 is generated by the operating system 154 in response to a display event. In some examples, the action signal 133 is considered an operating system signal.

In some examples, the enforcement engine 130 is at least partially executed by a window manager of the operating system 154. The window manager is configured to manage display and rendering events associated with content that is rendered within a window on the display 148. In some examples, the window manager may receive a display event that indicates a certain action taken with respect to the display 148, and the window manager extracts content metadata from the display event. The content metadata may include information about the source of the content. The window manager may detect that the source of the content (extracted from the display event) corresponds to (e.g., matches) the source 172 identified in the DLP control 118.

In some examples, the action signal 113 includes a signal indicating a wireless transmission generated by the operating system 154 for a data transfer to another device. In some examples, the wireless transmission signal may identify the source, destination, and/or other content attributes of the content to be transferred. In some examples, if the wireless transmission is Bluetooth, the action signal 113 may include a Bluetooth control signal configured to be received by a transceiver to initiate the Bluetooth transmission. In some examples, if the wireless transmission is NFC, the action signal 113 may include an NFC control signal configured to be received by a transceiver to initiate the NFC transmission. In some examples, if the wireless transmission is infrared, the action signal 113 may include an infrared control signal configured to be received by a transceiver to initiate the infrared transmission. The enforcement engine 130 may intercept the action signal 133 (before the wireless transmission is executed) and apply the appropriate DLP control(s) 118. In some examples, the action signal 133 includes identification information about the target device and/or identification information about a user of the target device.

In some examples, with respect to file transfer requests, the action signal 133 may include a file system event that identifies the source and/or destination of content that is subject to the file transfer request. For example, in response to receipt of a file transfer request from a user of the computing device 152, a file system event may be generated by the operating system to facilitate the transfer of the file. The enforcement engine 130 may intercept the file system event and extract content metadata from the file system event. The extracted content metadata may identify a source and/or destination of the content. The enforcement engine 130 may detect that the source (and/or destination) from the extracted content metadata corresponds to (e.g., matches) the source 172 (and/or destination 174) identified in the DLP control 118. In some examples, the enforcement engine 130 is executable by one or more sub-components of the operating system 154. In some examples, the operating system 154 includes a container manager configured to manage the software containers 144. The container manager may define an application programming interface (API) configured to intercept the file system event and extract the content metadata to identify the source and/or destination of the content. In some examples, the operating system 154 includes an OS kernel having a file transfer interceptor. At the OS kernel-level, the file transfer interceptor is configured to intercept the file system event and extract the content metadata to identify the source and/or destination of the content.

In some examples, with respect to clipboard restrictions, the action signal 133 may include a clipboard request that identifies a source and/or destination of content to be copied, cut, or pasted. In some examples, the operating system 154 may include a clipboard manager configured to manage the operations of the computer clipboard. The clipboard manager may obtain the clipboard request and extract content metadata about the source and/or destination of the content to be copied, cut, or pasted. The clipboard manager may detect that the source and/or destination of the content extracted from the content metadata corresponds to (e.g., matches) the source 172 and/or the destination 174 of the DLP control 118.

In this manner, regardless of whether content is rendered by a native application 142*a* or a virtual application 142*b* (or by the operating system 154 itself), the enforcement engine 130 is configured to determine whether on-screen content includes the restricted content 134.

In some examples, the enforcement engine 130 is configured to receive a signal from the content analyzer 108, where the signal indicates whether the content that is subject to the computer function 126 includes restricted content 134. In some examples, the content analyzer 108 may generate a signal that can trigger the enforcement engine 130 to restrict the computer function(s) 126 at an operating system level. The content analyzer 108 is configured to analyze the content itself (e.g., the content that is subject to the computer function 126) to determine whether the content includes restricted content 134. The content analyzer 108 may analyze the content to determine whether the content includes restricted content 134 such as social security numbers, credit card information, trade secrets, confidential technical data, financial data, and/or personally identifiable information, etc.

In some examples, the content analyzer 108 is executable by the computing device 152. In some examples, the content identifier 108 is executable by the server computer 102. For example, the computing device 152 may transmit (e.g., upload), over the network 150, the content subject to the computer function 126 to the server computer 102, where the content analyzer 108 at the server computer 102 is configured to determine whether the content includes the restricted content 134. If so, the content analyzer 108 at the server computer 102 is configured to transmit a response to the enforcement engine 130, where the response indicates whether or not the content includes the restricted content 134.

In some examples, the content analyzer 108 includes a text scanner 112 configured to perform a scan of the content to identify whether that content includes the keyword(s) 164. For example, the text scanner 112 may recognize text from a content source (e.g., file, web location, on-screen content, etc.) and determine whether the text includes or is associated with the keyword(s) 164. In some examples, the text scanner 112 is an optical character recognition (OCR) scanner.

In some examples, the content analyzer 108 includes a machine-learning (ML) model 110 that predicts whether the content is restricted content 134. In some examples, the content analyzer 108 is configured to execute using an accelerator 147 on the operating system 154. The accelerator 147 may improve the performance of ML models (including the content analyzer 108) that execute on the computing device 152. In some examples, the accelerator 147 includes an application-specific integrated circuit (ASIC) for neural network machine learning. In some examples, the ML model 110 is trained according to one or more ML techniques that is configured to identify restricted content 134 using content as an input. In some examples, the ML model 110 also receives the keyword(s) 164 as an input. In some examples, the ML model 110 does not receive the keyword(s) 164 as an input. In some examples, the ML model 110 may be trained according to parameters that are established by the organization or the administrator such that the ML model 110 can predict whether the content includes restricted content 134 that is tailored for a particular organization.

A ML model 110 is a predictive model. In some examples, a ML model 110 includes a neural network. The ML model 110 may be an interconnected group of nodes, each node representing an artificial neuron. The nodes are connected to each other in layers, with the output of one layer becoming the input of a next layer. The ML model 110 transforms an input, received by the input layer, transforms it through a series of hidden layers, and produces an output via the output layer. Each layer is made up of a subset of the set of nodes. The nodes in hidden layers are fully connected to all nodes in the previous layer and provide their output to all nodes in the next layer. The nodes in a single layer function independently of each other (i.e., do not share connections). Nodes in the output provide the transformed input to the requesting process. In some examples, the ML model 110 is a convolutional neural network, which is a neural network that is not fully connected. Convolutional neural networks therefore have less complexity than fully connected neural networks. Convolutional neural networks can also make use of pooling or max-pooling to reduce the dimensionality (and hence complexity) of the data that flows through the neural network and thus this can reduce the level of computation required. This makes computation of the output in a convolutional neural network faster than in neural networks.

The ML model 110 includes a set of computational processes for receiving a set of inputs (e.g., input values) and generating one or more outputs (e.g., output values). In some examples, the output value(s) may represent whether the content includes restricted content 134. The plurality of layers may include an input layer, one or more hidden layers, and an output layer. In some examples, one or more of the outputs the output layer represents a possible prediction (e.g., whether the data includes restricted content 134). In some examples, the output of the output layer with the highest value represents the prediction.

In some examples, the ML model 110 is a deep neural network (DNN). For example, a deep neural network (DNN) may have one or more hidden layers disposed between the input layer and the output layer. However, the ML model 110 may be any type of artificial neural network (ANN) including a convolution neural network (CNN). The neurons in one layer are connected to the neurons in another layer via synapses. Each synapse is associated with a weight. A weight is a parameter within the ML model 110 that transforms input data within the hidden layers. As an input enters the neuron, the input is multiplied by a weight value and the resulting output is either observed or passed to the next layer in the ML model 110. For example, each neuron has a value corresponding to the neuron's activity (e.g., activation value). The activation value can be, for example, a value between 0 and 1 or a value between −1 and +1. The value for each neuron is determined by the collection of synapses that couple each neuron to other neurons in a previous layer. The value for a given neuron is related to an accumulated, weighted sum of all neurons in a previous layer. In other words, the value of each neuron in a first layer is multiplied by a corresponding weight and these values are summed together to compute the activation value of a neuron in a second layer. Additionally, a bias may be added to the sum to adjust an overall activity of a neuron. Further, the sum including the bias may be applied to an activation function, which maps the sum to a range (e.g., zero to 1). Possible activation functions may include (but are not limited to) rectified linear unit (ReLu), sigmoid, or hyperbolic tangent (Tan H).

In some examples, the content analyzer 108 may include an audio analyzer configured to convert the audio data to speech and detect whether the speech itself includes one or more keywords 164. In some examples, the audio analyzer includes a ML model configured to receive the audio data as an input and detect whether the audio data includes restricted content 134. In some examples, the content analyzer 108 includes a video analyzer configured to analyze the video data to determine whether the video data includes restricted content 134 that would be displayed on the display 148. The video analyzer may determine that text, graphics, and/or drawings include one or more keywords 164. In some examples, the video analyzer may include a ML model configured to receive the video data as an input and detect whether the video data includes restricted content 134.

Figure 2:
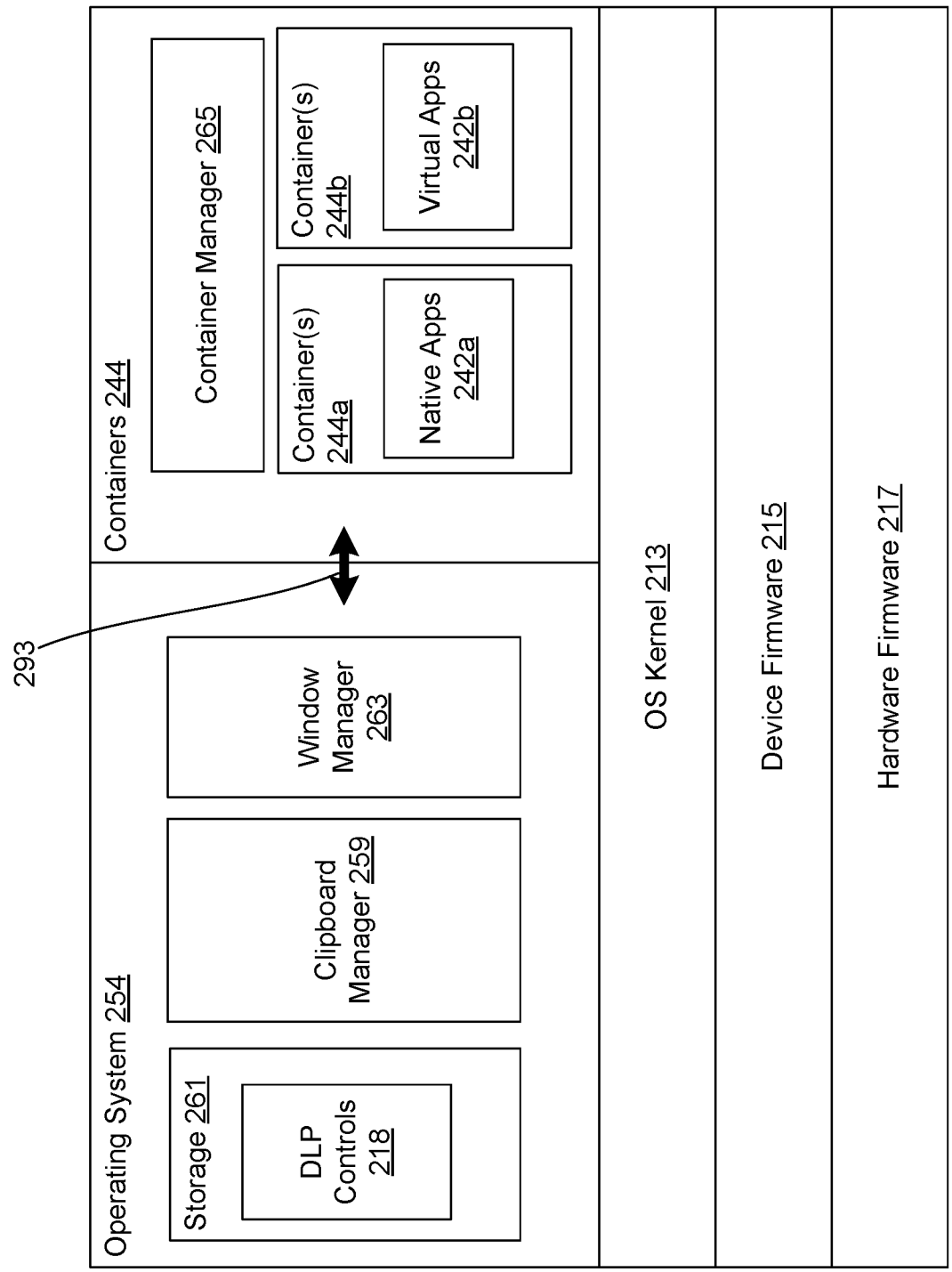
FIG. 2 illustrates an operating system configured to implement an enforcement engine that applies the DLP controls according to an aspect.

FIG. 2 illustrates an operating system 254 according to another aspect. The operating system 254 may be an example of the operating system 154 of FIGS. 1A through 1D and may include any of the features discussed with respect to those figures. The operating system 254 may include a storage 261, a clipboard manager 259, and a window manager 263. The storage 261 may store the DLP controls 218.

The operating system 254 may include one or more software containers 244 and a container manager 265 configured to manage system operations of the software containers 244. In some examples, instead of using a software container 244, the operating system 254 defines a virtual machine that is configured to launch and execute the applications. The window manager 263, the clipboard manager 259, and the storage 261 may communicate with the container manager 265 and the containers 244 via an interprocess communication (IPC) link 293.

In some examples, the software containers 244 include one or more containers 244a configured to launch and execute native applications 242a and one or more software containers 244b configured to launch and execute one or more virtual applications 242b. A software container 244 may be an instance of another operating system. In some examples, the software container 244a (or virtual machine) shares an OS kernel 213 with the operating system 254. In some examples, the software container 244b (or virtual machine) shares an OS kernel 213 with the operating system 254. In some examples, the software container 244a and the software container 244b share the same OS kernel 213. In some examples, the software container 244a, the software container 244b, and the operating system 254 do not share an OS kernel 213 with each other. The OS kernel 213 is the primary interface between the hardware and the processes of a computing device. The OS kernel 213 is an initial program that is loaded into memory before the boot loader. The OS kernel 213 may operate on device firmware 215, which operates on hardware firmware 217. A software container 244 (or virtual machine) may be a runtime platform that includes software dependencies required by the applications that it launches and executes, such as specific versions of programming language runtimes and other software libraries that assist with executing the applications.

In some examples, the container manager 265 is configured to intercept a file system event generated by one of the software containers 144 and extract content metadata from the file system event. The extracted content metadata may identify a source and/or destination of the content. In some examples, the container manager 265 may receive the DLP controls 218 via the IPC link 293 and determine whether the source and/or destination of the content corresponds to one of the sources and/or destinations identified by the DLP controls 218. In some examples, the container manager 265 may transmit the extracted metadata to the operating system 254 via the IPC link 293, where the operating system 254 determines whether the source and/or destination of the content corresponds to one of the sources and/or destinations identified by the DLP controls 218.

In some examples, the operating system 254 is configured to intercept a file system event transmitted via the IPC link, extract content metadata, and determine whether the source and/or destination of the content corresponds to one of the sources and/or destinations identified by the DLP controls 218. In some examples, the OS kernel 213 is configured to intercept a file system event generated by the operating system 254 and/or the containers 244, extract content metadata, and determine whether the source and/or destination of the content corresponds to one of the sources and/or destinations identified by the DLP controls 218.

In some examples, the window manager 263 is configured to detect a display event involving on-screen content and extract content metadata from the display event. In some examples, the display event is generated by one of the software containers (e.g., container 244a or container 244b) when display content to be rendered has changed and received by the window manager 263 via the IPC link 293. The extracted content metadata may identify a source of the on-screen content. The window manager 263 may determine whether the source of the on-screen content extracted from the content metadata correspond to (e.g., matches) the source identified by the DLP controls 218. In some examples, the container manager 265 is configured to detect a display event involving on-screen content and extract content metadata from the display event. In some examples, the display event is generated by one of the software containers (e.g., container 244a or container 244b) when display content to be rendered has changed. The extracted content metadata may identify a source of the on-screen content. The container manager 265 may determine whether the source of the on-screen content extracted from the content metadata correspond to (e.g., matches) the source identified by the DLP controls 218.

In some examples, the clipboard manager 259 is configured to detect a clipboard request that identifies a source and/or destination of content to be copied, cut, or pasted. The clipboard manager 259 may obtain the clipboard request and extract content metadata about the source and/or destination of the content to be copied, cut, or pasted. The clipboard manager 259 may detect that the source and/or destination of the content extracted from the content metadata corresponds to (e.g., matches) the source and/or the destination of the DLP control 218.

Figure 3:
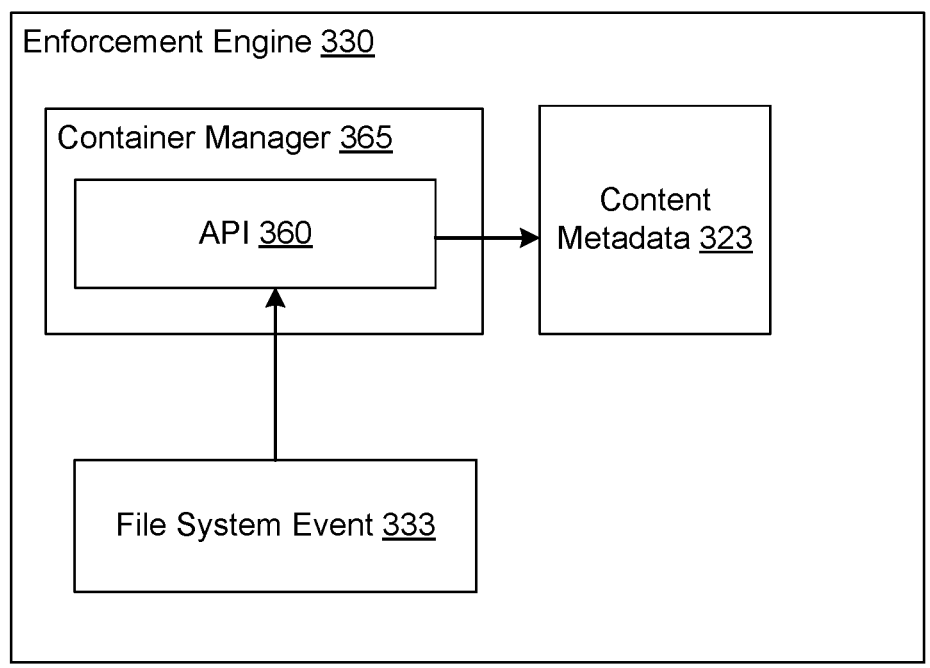
FIG. 3 illustrates an example of an enforcement engine for applying DLP controls to restrict file transfer requests according to an aspect.

FIG. 3 illustrates an example of an enforcement engine 330 according to an aspect. The enforcement engine 330 may include any of the details discussed with reference to FIGS. 1A through 1D and 2. The enforcement engine 330 may be executable by (at least in part) a container manager 365, which is an example of the container manager 265 of FIG. 2. In some examples, the container manager 365 includes an operating system daemon. An operating system daemon may be a program executable in a background that monitors (and controls) system functions or provides functionality to other processes. In some examples, the container manager 365 may define an application programming interface (API) 360. The API 360 is configured to intercept a file system event 333, which is generated in response to a user requesting that a file be transferred. In some examples, the file system event 333 is an example of the action signal 133 of FIGS. 1A through 1D. The API 360 is configured to extract content metadata 323 from the file system event 333, where the content metadata 323 may identify a source and/or destination of the content that is subject to the file transfer request. The enforcement engine 330 may detect that the source and/or destination of the content metadata 323 correspond to (e.g., matches) one of the sources and/or destinations of the DLP controls.

Figure 4:
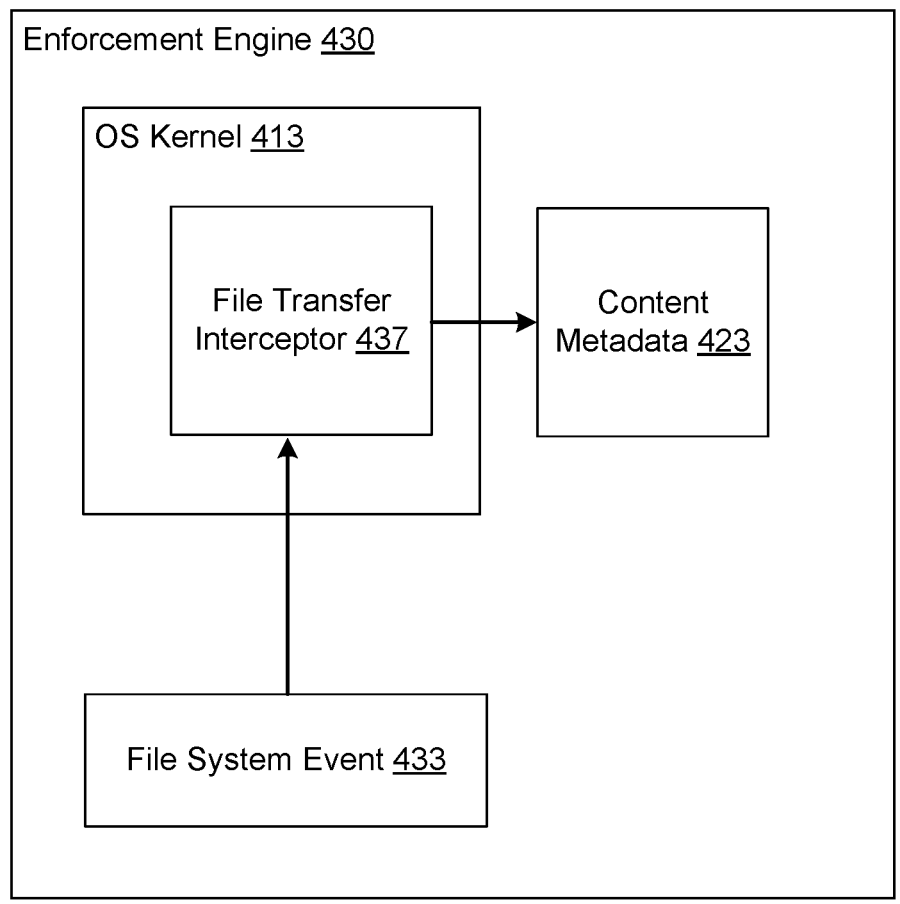
FIG. 4 illustrates an example of an enforcement engine for applying DLP controls to restrict file transfer requests according to another aspect.

FIG. 4 illustrates an example of an enforcement engine 430 according to an aspect. The enforcement engine 430 may include any of the details discussed with reference to FIGS. 1A through 1D and 2. The enforcement engine 430 may be executable by (at least in part) an OS kernel 413, which is an example of the OS kernel 213 of FIG. 2. The OS kernel 413 may include a file transfer interceptor 437 configured to intercept a file system event 433, which is generated in response to a user requesting that a file be transferred. In some examples, the file system event 433 is an example of the action signal 133 of FIGS. 1A through 1D. The file transfer interceptor 437 is configured to extract content metadata 423 from the file system event 433, where the content metadata 423 may identify a source and/or destination of the content that is subject to the file transfer request. The enforcement engine 430 may detect that the source and/or destination of the content metadata 423 correspond to (e.g., matches) one of the sources and/or destinations of the DLP controls.

Figure 5:
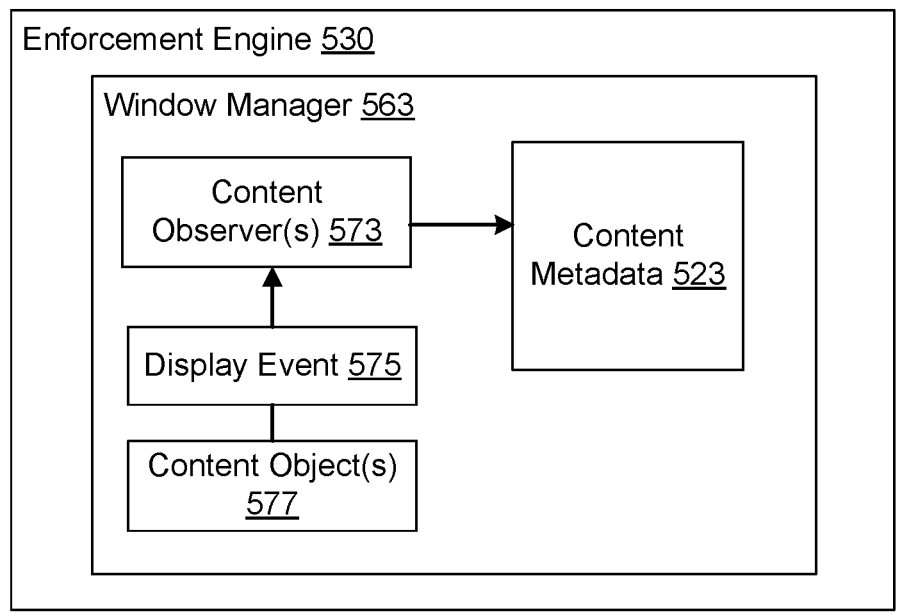
FIG. 5 illustrates an example of an enforcement engine for applying DLP controls to restrict on-screen content functions according to an aspect.

FIG. 5 illustrates an example of an enforcement engine 530 according to an aspect. The enforcement engine 530 may include any of the details discussed with reference to FIGS. 1A through 1D and 2. The enforcement engine 530 may be executable by (at least in part) a window manager 563, which is an example of the window manager 263 of FIG. 2. The window manager 563 may include one or more content observers 573 configured to monitor one or more content objects 577. A content object 577 may be a unit of on-screen content, where the content object(s) 577 may represent a browser tab, a web application, a web extension, and/or an OS system application UI. A content object 577 may execute rendering inside itself and provide information about its contents including navigation history. In some examples, the content observers 573 are configured to be attached to the content objects 577 and receive a display event 575 every time something significant happens with the content objects 577. In some examples, the display event 575 is an example of the action signal 133 of FIGS. 1A through 1D. The display event 575 includes information about the source of the content to be rendered on the device's display. In some examples, the content observer(s) 573 uses the display event 575 to extract content metadata 523, where the content metadata 523 may identify a source of the on-screen content. The enforcement engine 530 may detect that the source of the content metadata 523 corresponds to (e.g., matches) one of the sources of the DLP controls.

Figure 6:
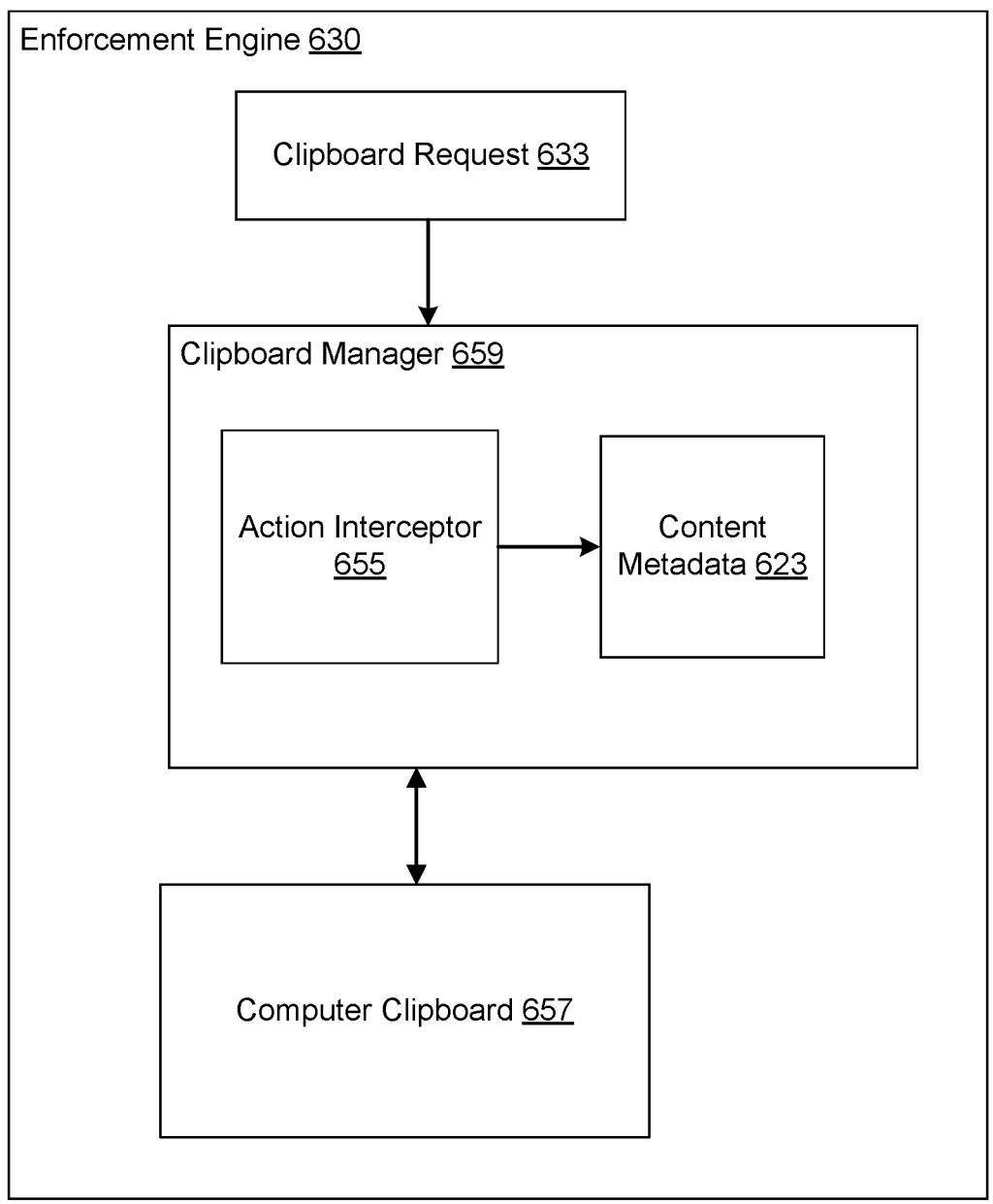
FIG. 6 illustrates an example of an enforcement engine for applying DLP controls to restrict a clipboard function according to an aspect.

FIG. 6 illustrates an example of an enforcement engine 630 according to an aspect. The enforcement engine 630 may include any of the details discussed with reference to FIGS. 1A through 1D and 2. The enforcement engine 630 may be executable by (at least in part) a clipboard manager 659, which is an example of the clipboard manager 259 of FIG. 2. The clipboard manager 659 is configured to manage the operations of a computer clipboard 657. The clipboard manager 659 may include an action interceptor 655. The action interceptor 655 is configured to detect a clipboard request 633 that identifies a source and/or destination of content to be copied, cut, or pasted. The action interceptor 655 may obtain the clipboard request 633 and extract content metadata 623 about the source and/or destination of the content to be copied, cut, or pasted. The enforcement engine 630 may detect that the source and/or destination of the content extracted from the content metadata 623 corresponds to (e.g., matches) the source and/or the destination of the DLP control.

Figure 7:
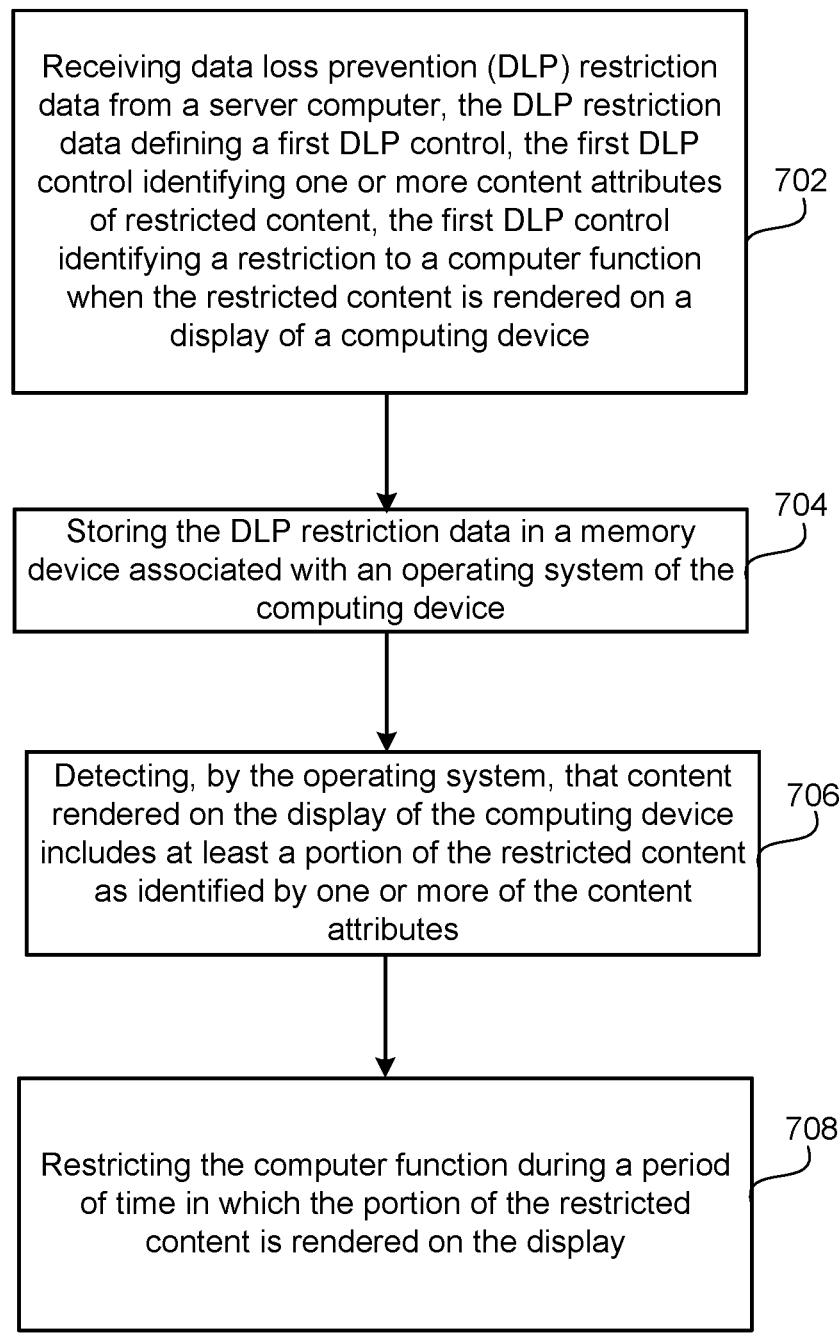
FIG. 7 illustrates a flowchart depicting example operations of a DLP system according to an aspect.

FIG. 7 illustrates a flowchart 700 depicting example operations of a DLP system according to an aspect. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion. Although the flowchart 700 is described with reference to the DLP system 100 of FIGS. 1A through 1D, the flowchart 700 may be executed according to any of the systems described with reference to FIGS. 1A through 6.

The operations of the flowchart 700 may be performed by any of the computing devices discussed herein, including computing device 152. For example, the computing device 152 is configured to implement, locally and offline, data loss prevention (DLP) controls 118 at an operating system level and across different applications 142. The operations of the flowchart 700 may provide a technical solution of integrating DLP controls 118 with a user device's operating system 154, which provides a technical benefit of increasing the security of data on computing devices. For example, even if the user downloads sensitive data locally, since the DLP controls 118 are implemented by the device's operating system 154, certain computer functionalities can still be restricted to minimize data leakage incidents. In some examples, the operations of the flowchart 700 may provide a technical benefit of increasing the security of a computing device 152 by preventing a user from circumventing the DLP controls 118 at the server computer 102 when the computing device 152 is not connected to the network 150 and/or the user has deactivated her internet connection.

In some examples, instead of individually configuring multiple applications 142 (or multiple types of applications 142) to implement DLP controls 118, the DLP controls 118 are centrally managed and can be applied across a number of different applications 142. For example, the computing device 152 may execute native applications 142a and virtual applications 142b, which, in some examples, may require different DLP implementations, which can increase the complexity of a DLP solution. However, the operations of the flowchart 700 may configure a computing device 152 to apply computer functionality restrictions for sensitive content rendered by (and/or transferred to, from, and/or between) a virtual application 142b and a native application 142a that reduces the amount of computing resources (e.g., memory, central processing unit (CPU) power).

Operation 702 includes receiving data loss prevention (DLP) restriction data 116 from a server computer 102, where the DLP restriction data defines a first DLP control 118. The first DLP control 118 identifies one or more content attributes 124 of restricted content 134. The first DLP control 118 identifies a restriction to a computer function 126 when the restricted content 134 is rendered on a display 148 of a computing device 152.

Operation 704 includes storing the DLP restriction data 116 in a memory device 158 associated with an operating system 154 of the computing device 152. Operation 706 includes detecting, by the operating system 154, that content rendered on the display 148 of the computing device 152 includes at least a portion of the restricted content 134 as identified by one or more of the content attributes 124. Operation 708 includes restricting the computer function 126 during a period of time in which the portion of the restricted content 134 is rendered on the display 148.

FIG. 8 shows an example of a computer device 800 and a mobile computer device 850, which may be used with the techniques described here. In some implementations, the computing device 152 of FIGS. 1A through 1D is an example of the computer device 800 or the mobile computer device 850. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in a information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions are examples only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more computing devices 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850 or may also store applications or other information for device 850. Specifically, expansion memory 874 may include instructions to carry out or supplement the processes described above and may include secure information also. Thus, for example, expansion memory 874 may be provided as a security module for device 850 and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or another similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or non-transitory medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:
   receiving data loss prevention (DLP) restriction data, the DLP restriction data including a DLP control identifying at least one content attribute of restricted content and a restriction to a computer function when the restricted content is rendered on a display of a computing device;
   storing the DLP restriction data in a memory device associated with an operating system of the computing device, the operating system including a first software container executing a native application and a second software container executing a virtual application;
   detecting, by a window manager of the operating system, a first display event generated by the first software container, the first display event including a content attribute of content to be rendered on the display;
   detecting, by the window manager, a second display event generated by the second software container, the second display event including a content attribute of content to be rendered on the display;
   detecting, by the window manager, that the content attribute from the first display event or the content attribute from the second display event corresponds to the at least one content attribute of the DLP control; and
   restricting the computer function during a period of time in which the restricted content is rendered on the display.

2. The method of claim 1, further comprising:
   disabling the restriction to the computer function in response to the restricted content not being detected as rendered on the display.

3. The method of claim 1, wherein the computer function includes at least one of a screenshot function, a screencast function, or a printing function.

4. The method of claim 1, wherein the computer function includes a display screen function in which the restriction to the display screen function reduces a viewing angle of the content rendered on the display.

5. The method of claim 1, wherein the at least one content attribute includes a web location of a computer resource.

6. The method of claim 1, wherein the DLP control is a first DLP control, the DLP restriction data including a second DLP control identifying a restriction to a file transfer function to transfer a computer file.

7. The method of claim 6, further comprising:
   intercepting a file system event;
   extracting content metadata from the file system event, the content metadata identifying a content attribute of the computer file;
   detecting that the content attribute from the content metadata corresponds to a content attribute identified in the second DLP control; and
   restricting transfer of the computer file.

8. The method of claim 1, wherein the DLP control is a first DLP control, the DLP restriction data including a second DLP control identifying a restriction to a clipboard function.

9. The method of claim 8, further comprising:
   detecting a clipboard request;
   extracting content metadata from the clipboard request, the content metadata identifying a content attribute of content subject to the clipboard function;
   detecting that the content attribute from the content metadata corresponds to a content attribute identified in the second DLP control; and
   disabling the clipboard function.

10. An apparatus comprising:
    at least one processor; and
    a non-transitory computer readable medium storing executable instructions that when executed by the at least one processor cause the at least one processor to:
    store data loss prevention (DLP) restriction data in a memory device associated with an operating system of a computing device, the DLP restriction data including a DLP control identifying at least one content attribute of restricted content and a restriction to a computer function when the restricted content is rendered on a display of the computing device, the operating system including a first software container executing a native application and a second software container executing a virtual application;
    detect, by a window manager of the operating system, a first display event generated by the first software container, the first display event including a content attribute of content to be rendered on the display;
    detect, by the window manager, a second display event generated by the second software container, the second display event including a content attribute of content to be rendered on the display;
    detect, by the window manager, that the content attribute from the first display event or the content attribute from the second display event corresponds to the at least one content attribute in the DLP control; and
    restrict the computer function during a period of time in which the restricted content is rendered on the display.

11. The apparatus of claim 10, wherein the restriction to the computer function includes enablement of an electronic privacy screen on the display.

12. The apparatus of claim 10, wherein the DLP control is a first DLP control, the DLP restriction data including a second DLP control identifying a restriction to a file transfer function to transfer a computer file, wherein the executable instructions include instructions that when executed by the at least one processor cause the at least one processor to:

intercept, by an application programming interface, a file system event;

extract content metadata from the file system event, the content metadata identifying a content attribute of the computer file;

detect that the content attribute from the content metadata corresponds to a content attribute in the second DLP control; and restrict transfer of the computer file.

13. The apparatus of claim 12, wherein the DLP restriction data includes a third DLP control identifying a restriction to a clipboard function, wherein the executable instructions include instructions that, when executed by the at least one processor, cause the at least one processor to:

detect a clipboard request;

extract content metadata from the clipboard request, the content metadata identifying at least one of a source or destination of content subject to the clipboard function;

detect that at least one of the source or the destination from the content metadata corresponds to at least one of a source or destination identified in the second DLP control; and disable the clipboard function.

14. The apparatus of claim 10, wherein the second display event is detected via an inter-process communication (IPC) link between the second software container and the window manager.

15. A non-transitory computer-readable medium storing executable instructions that, when executed by at least one processor, cause the at least one processor to execute operations, the operations comprising:

receiving data loss prevention (DLP) restriction data, the DLP restriction data including a DLP control identifying at least one content attribute of restricted content and a restriction to a computer function when the restricted content is rendered on a display of a computing device;

storing the DLP restriction data in a memory device associated with an operating system of the computing device, the operating system including a first software container executing a native application and a second software container executing a virtual application;

detecting, by a window manager of the operating system, a first display event generated by the first software container, the first display event including a content attribute of content to be rendered on the display;

detecting, by the window manager, a second display event generated by the second software container, the second display event including a content attribute of content to be rendered on the display;

detecting, by the window manager, that the content attribute from the first display event or the content attribute from the second display event corresponds to at least one content attribute of the DLP control; and restricting the computer function during a period of time in which the restricted content is rendered on the display.

16. The non-transitory computer-readable medium of claim 15, wherein the DLP control is a first DLP control, the DLP restriction data including a second DLP control identifying a restriction to a file transfer function when a computer file includes the restricted content, the operations further comprising:

receiving, by a content analyzer, contents of the computer file; and detecting, by the content analyzer, that the contents of the computer file include at least a portion of the restricted content.

17. The non-transitory computer-readable medium of claim 16, wherein the content analyzer includes a machine-learning model.

* * * * *